(12) United States Patent
Niikura et al.

(10) Patent No.: US 12,353,048 B2
(45) Date of Patent: Jul. 8, 2025

(54) LENS DEVICE

(71) Applicant: CBC CO., LTD., Tokyo (JP)

(72) Inventors: Tsunemi Niikura, Tokyo (JP); Kazutaka Shibuya, Tokyo (JP); Katsuya Hirano, Tokyo (JP)

(73) Assignee: CBC CO., LTD. (JP)

( * ) Notice: Subject to any disclaimer, the term of this patent is extended or adjusted under 35 U.S.C. 154(b) by 550 days.

(21) Appl. No.: 17/778,559

(22) PCT Filed: Dec. 2, 2019

(86) PCT No.: PCT/JP2019/047088
§ 371 (c)(1),
(2) Date: May 20, 2022

(87) PCT Pub. No.: WO2021/111505
PCT Pub. Date: Jun. 10, 2021

(65) Prior Publication Data
US 2022/0413254 A1 Dec. 29, 2022

(51) Int. Cl.
*G02B 7/08* (2021.01)

(52) U.S. Cl.
CPC .................................... *G02B 7/08* (2013.01)

(58) Field of Classification Search
CPC .......... G02B 7/08; H04N 23/54; H04N 23/57; H04N 23/55; H04N 23/69; G03B 17/12
See application file for complete search history.

(56) References Cited

U.S. PATENT DOCUMENTS

| | | | |
|---|---|---|---|
| 9,544,477 B2 | 1/2017 | Kaku et al. | |
| 2004/0130646 A1* | 7/2004 | Terada | H04N 23/55 348/335 |

(Continued)

FOREIGN PATENT DOCUMENTS

| | | |
|---|---|---|
| JP | 4273274 B2 | 6/2009 |
| JP | 5893746 B2 | 3/2016 |

(Continued)

OTHER PUBLICATIONS

K. Nogami et al. "High-Speed Multimedia Backbone Lan"; Toshiba Co., Japan; dated Jan. 25, 1992 (retrieved from the internet on Oct. 20, 2022) (total 7 pages).

(Continued)

*Primary Examiner* — James A Dudek
(74) *Attorney, Agent, or Firm* — Harness, Dickey & Pierce, P.L.C.

(57) ABSTRACT

A lens device with which a network can be pulled out from a lens main body and connected to an operation terminal is provided. The lens device for capturing an optical image includes: a lens mechanism for forming the optical image, the lens mechanism being built into a lens main body; a drive control unit for drive-controlling the lens mechanism, the drive control unit being built into the lens main body; a central processing unit that outputs a drive control signal to the drive control unit; and a network that forms a power supply interface for the lens main body, and a communication interface for the central processing unit. Thereby, the lens and the operation terminal are connected via the network, so that it is possible to expand the connection mode between the lens and the operation terminal to an n-to-one or n-to-n connection mode.

4 Claims, 13 Drawing Sheets

(56) References Cited

U.S. PATENT DOCUMENTS

| | | |
|---|---|---|
| 2015/0181128 A1 | 6/2015 | Kaku et al. |
| 2017/0178476 A1 | 6/2017 | Jeon et al. |
| 2017/0374290 A1 | 12/2017 | Otorii |
| 2019/0158748 A1 | 5/2019 | Maruhashi |

FOREIGN PATENT DOCUMENTS

| | | |
|---|---|---|
| JP | 2019-095590 A | 6/2019 |
| WO | 2016-139875 A1 | 9/2016 |

OTHER PUBLICATIONS

European Search Report issued in the corresponding European Patent Application No. 19955202.7 dated Oct. 31, 2022 (total 8 pages).

International Search Report (English and Japanese) issued in PCT/JP2019/047088, mailed Mar. 3, 2020; ISA/JP (6 pages).

\* cited by examiner

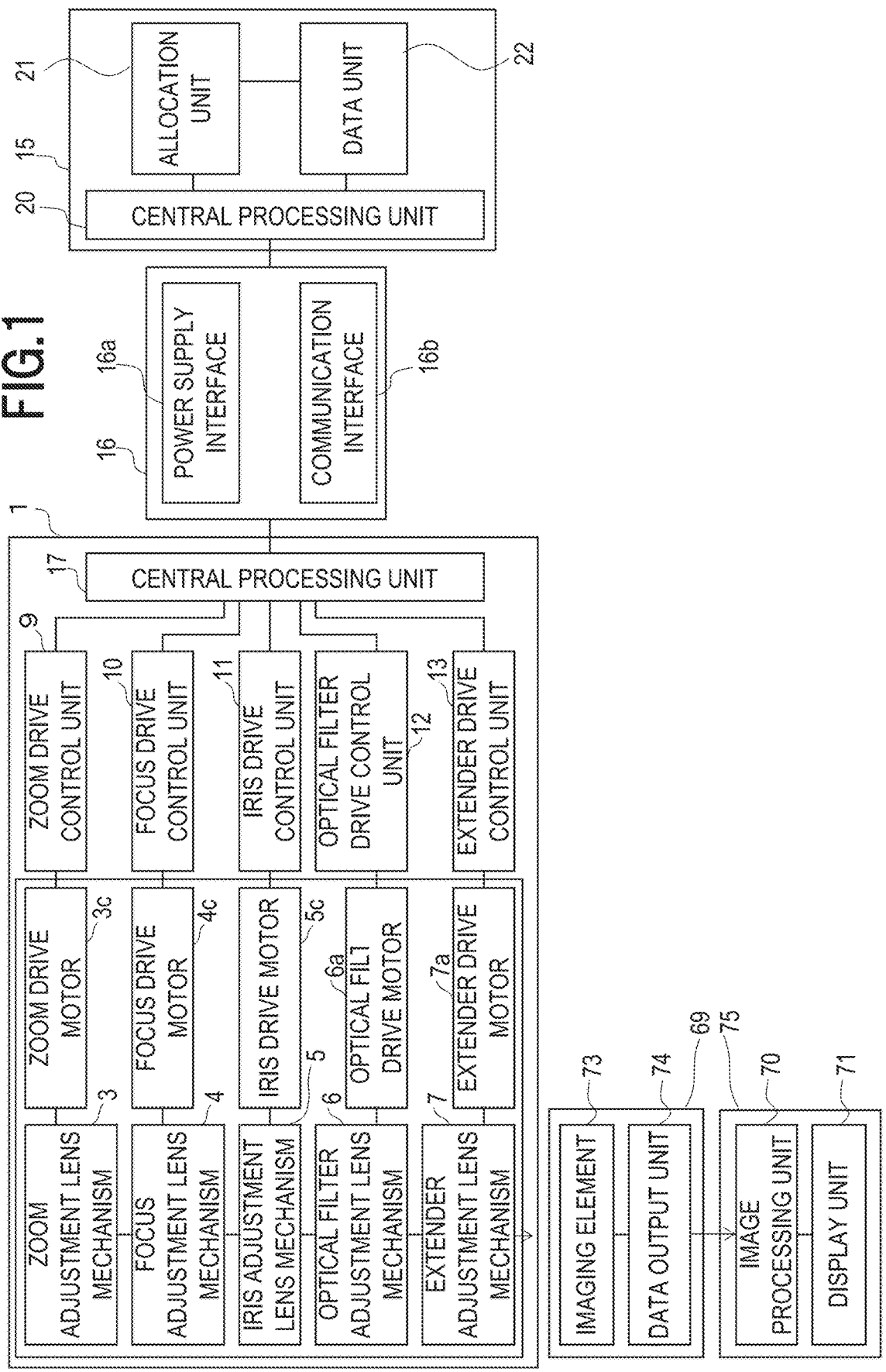

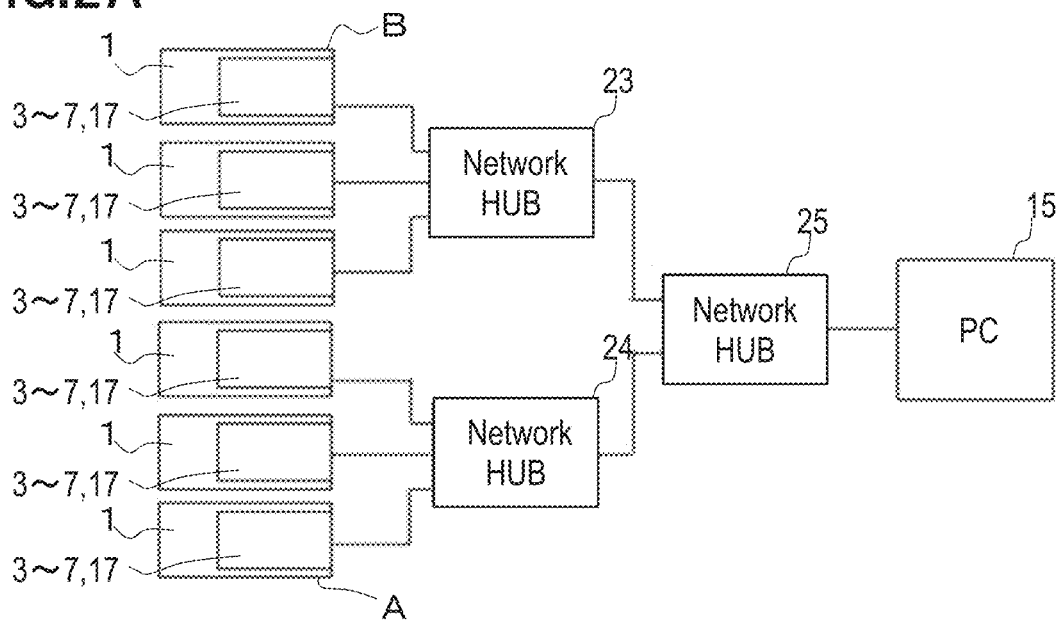
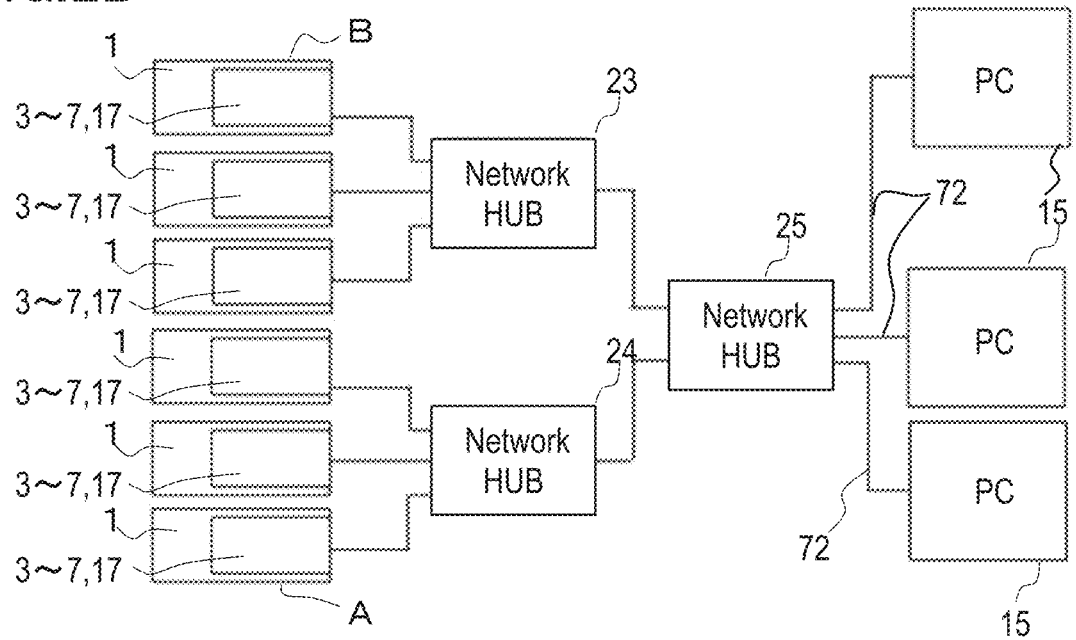

FIG.4E
FIG.4F
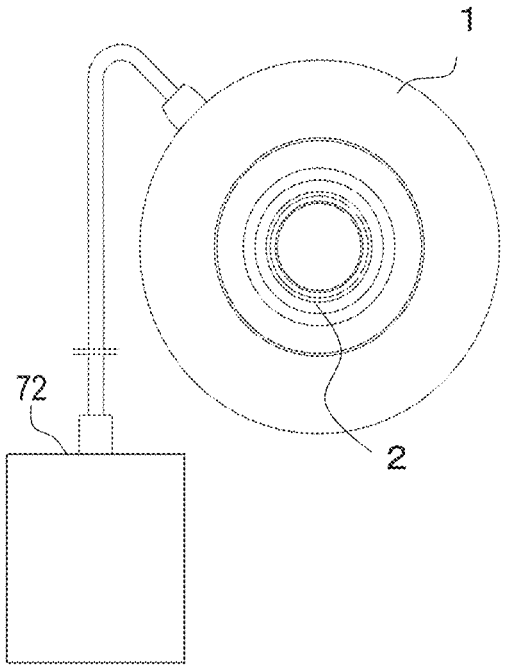
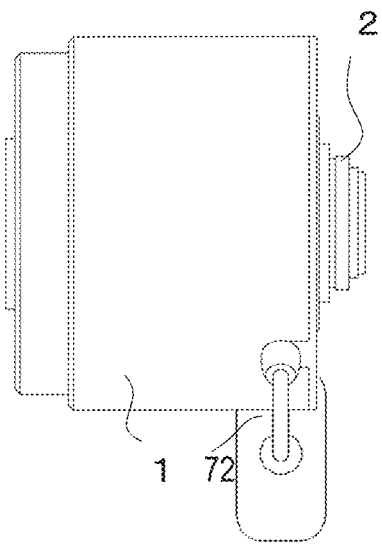
FIG.4G
FIG.4H
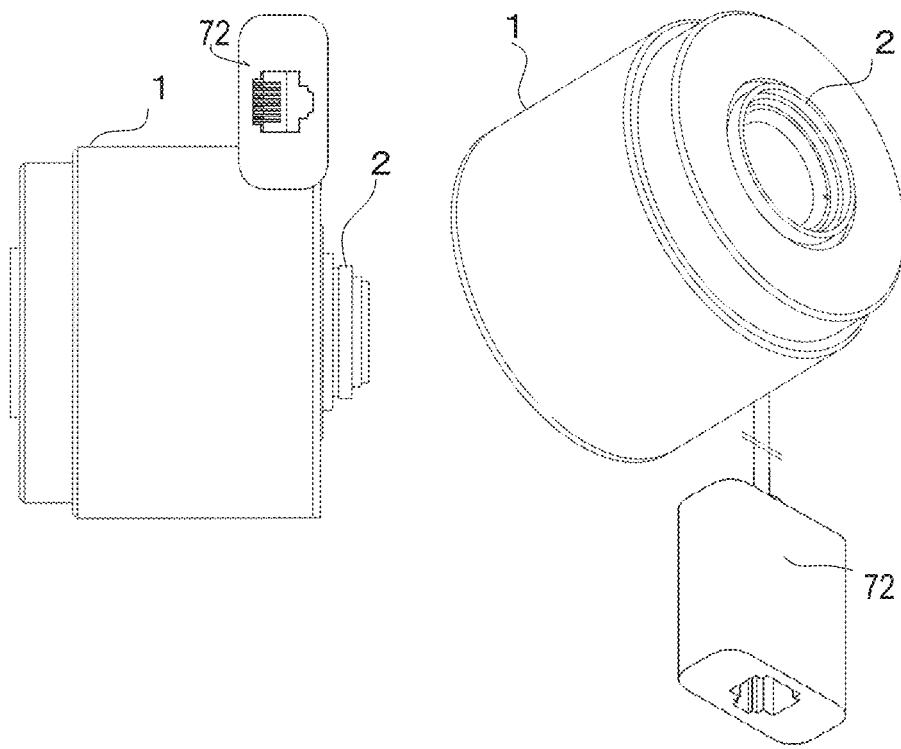

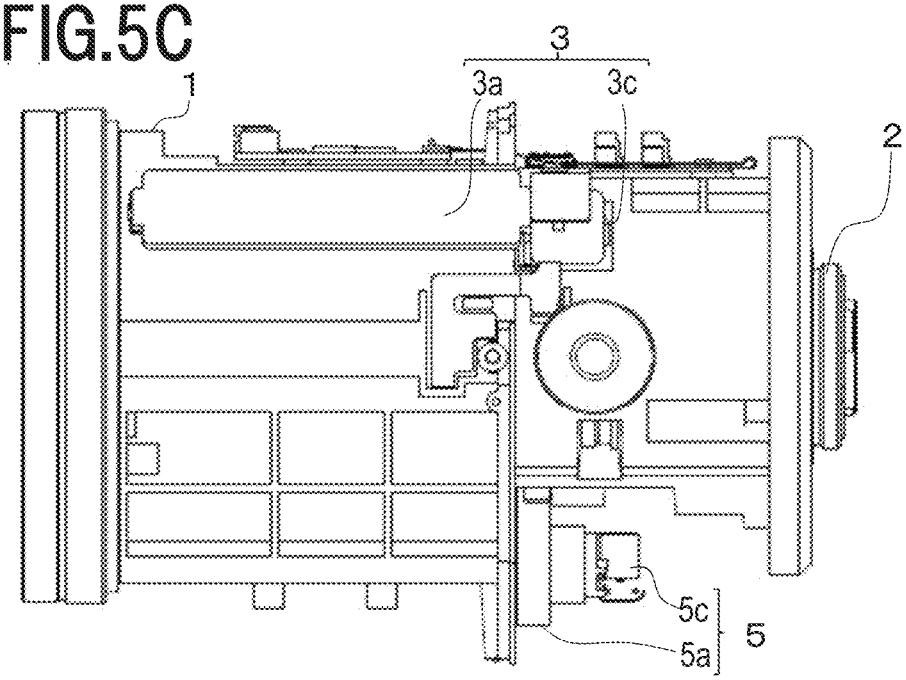

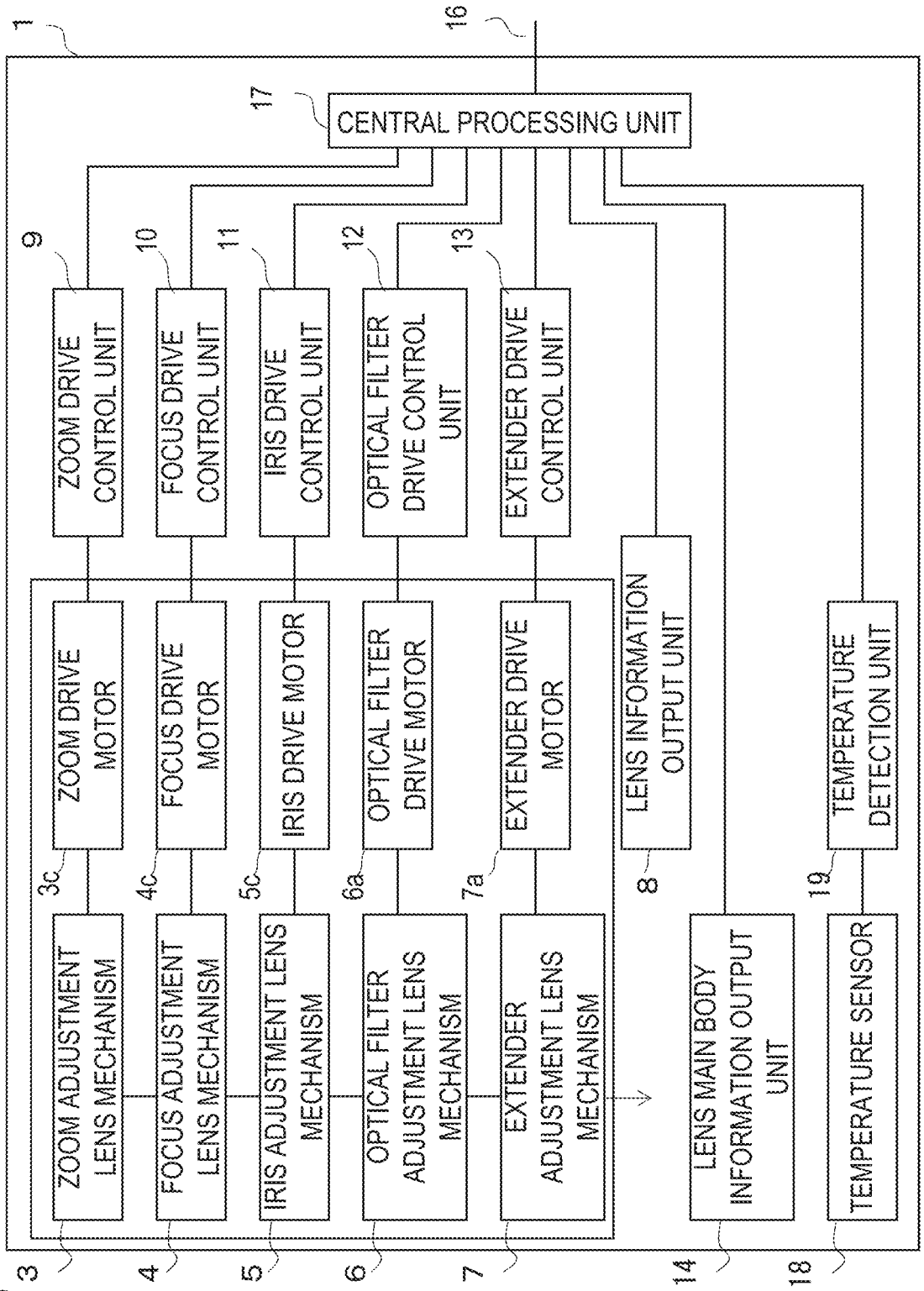

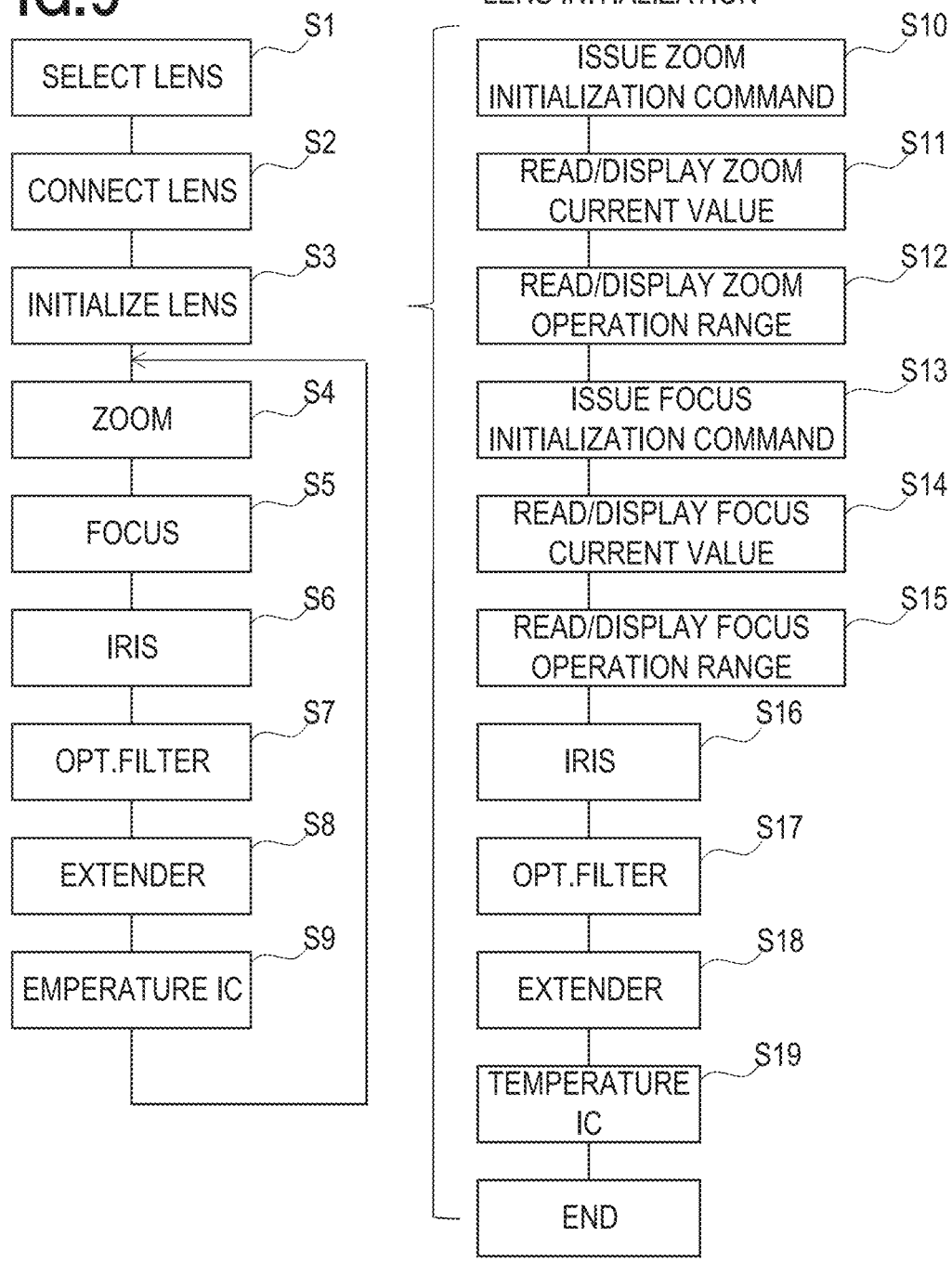

LENS DEVICE

CROSS REFERENCE TO RELATED APPLICATIONS

This application is a U.S. National Phase Application under 35 U.S.C. 371 of International Application No. PCT/JP2019/047088, filed on Dec. 2, 2019. The entire disclosure of the above application is expressly incorporated by reference herein.

BACKGROUND

Technical Field

The present invention relates to a lens device with which a network can be pulled out from a lens main body and connected to an operation terminal.

Related Art

As camera devices for surveillance, industrial use, and the like, an IP camera (network camera), a CCTV (Closed-circuit Television) camera, an FA (Factory Automation) camera, and the like are widely used. Furthermore, as the camera device for such use, also known is a type that includes a compatible lens mount such as a C mount or a CS mount such that a single focus lens or a variable focus lens (a zoom lens, a varifocal lens, or the like) can be mounted to the mount. With a combination of such compatible camera and lens, lens mechanisms of focus, zoom, and iris are drive-controlled to form an optical image through the lens mechanisms, the optical image is photoelectrically converted into image data of an electric signal by an imaging element, and the image data is image-processed into a visible image to be displayed on an operation screen.

With the single focus lens and the variable focus lens, it is possible to perform focus adjustment, zoom adjustment, and iris adjustment by driving the lens mechanisms of the focus, zoom, and iris, and products motorized by using a DC motor or a stepping motor for performing such adjustment are widely known.

There has been developed a camera device in which the DC motor or the stepping motor is applied to perform drive-control of the lens mechanisms, and the lens mechanisms are remotely operated by an operation terminal (Japanese Patent No. 4273274).

In Japanese Patent No. 4273274, disclosed is a lens control device that controls a lens disposed on a lens barrel or a diaphragm by driving a motor, and the lens control device includes: display means that displays an operation screen for instructing/inputting control content regarding the lens or the diaphragm on an operation screen; instruction input means for instructing/inputting the control content regarding the lens or the diaphragm on the operation screen displayed on the display means; and control means for controlling the lens or the diaphragm according to the control content instructed/input by the instruction input means, in which the lens is configured with a plurality of kinds of lenses controlled independently. Selection means for validating or invalidating the control of a prescribed lens according to the operation screen is provided therein, in which the lens and an operation terminal is connected via an RS232 cable.

In Japanese Patent No. 4273274, the lens and the operation terminal are connected vi the RS232 cable, so that the connection mode between the lens and the operation terminal is limited to a one-to-one relation via the RS232 cable. Thus, by providing the selection means for validating or invalidating the control of a prescribed lens according to the operation screen in a case where the lens is configured with a plurality of kinds of lenses controlled independently, it is necessary to perform an operation to validate the control of a single lens and invalidate the control of the remaining lenses by operating the selection means when a single lens is the control target. Therefore, it is not possible to expand the connection mode between a plurality of lenses and the operation terminal to an n-to-one mode. Especially, in a case of the camera for surveillance, industrial use, or the like, it is common to synchronize a plurality of lenses or to select and drive-control an arbitrary number of lenses from a plurality of lenses. Therefore, it is desired to develop a lens device capable securing the n-to-one connection mode.

In the case of Japanese Patent No. 4273274, the connection mode between the lens and the operation terminal is in a one-to-one relation and, for drive-controlling a plurality of lenses by a single operation terminal, connection between a plurality of lenses and a single operation terminal becomes complicated, thereby requiring specialized skills. Furthermore, since it is necessary to set a plurality of pieces of selection means for validating or invalidating the control of a plurality of lenses, it is also necessary to develop control means for controlling a plurality of pieces of selection means anew. Therefore, it is not possible to instantly have a plurality of lenses and a single operation terminal in an n-to-one connection mode.

In a case where the lens main body is connected to the camera main body by using a C mount or CS mount, the lens main body is optically and physically connected to the camera main body, so that there is generally no electrical communication or power feed interface existing between the lens main body and the camera main body.

As in Japanese Patent No. 4273274, the RS232 cable is used for the connection mode between the lens and the operation terminal, and the RS232 cable cannot feed the power to the lens. Therefore, it is necessary to provide an external power supply for driving the lens. When the external power supply is required, it is necessary to secure the power supply of the use voltage corresponding to driving the lens. Therefore, the user is required to have specialized skills for selecting the voltage and current to correspond to driving the lens.

It is therefore an object of the present invention to overcome the conventional issues described above, and to provide a lens device with which a network can be pulled out from a lens main body and connected to an operation terminal.

SUMMARY

In order to achieve the foregoing object, the lens device according to the present invention is a lens device for capturing an optical image, and the lens device includes: a lens mechanism for forming the optical image, the lens mechanism being built into a lens main body; a drive control unit for drive-controlling the lens mechanism, the drive control unit being built into the lens main body; a central processing unit that outputs a drive control signal to the drive control unit; and a network that forms a power supply interface for the lens main body, and a communication interface for the central processing unit.

The lens main body is optically and physically connected to a camera main body.

The lens main body is start-controlled independently from the camera main body based on the drive control signal from the central processing unit.

A power supply for the lens main body is secured within a range of allowable voltage and allowable current of the power supply interface.

A plurality of the lens main bodies are disposed on the network; and a plurality of the lens mechanisms are synchronously drive-controlled or selectively drive-controlled based on the drive control signal from the central processing unit.

The plurality of lens main bodies are aggregated via the network to be connected to a single operation terminal.

A plurality of operation terminals are connected to the network having the plurality of lens main bodies.

Advantageous Effects of Invention

As described above, according to the embodiment of the present invention, the lens device includes: the lens mechanism for forming an optical image, the lens mechanism being built into the lens main body; the drive control unit for drive-controlling the lens mechanism, the drive control unit being built unto the lens main body; the central processing unit that outputs the drive control signal to the drive control unit; and the network that forms the power supply interface for the lens main body and the communication interface for the central processing unit. Thus, the lens and the operation terminal are connected via the network, so that the connection mode between the lens and the operation terminal can be expanded to an n-to-one or n-to-n connection mode.

Since the connection mode regarding a plurality of lenses and the operation terminal can be expanded to an n-to-one mode, in a case of the camera for surveillance, industrial-use, and the like, it is possible to instantly deal with the case where a plurality of lenses are to be synchronized or where an arbitrary number of lenses are to be selected and drive-controlled from a plurality of lenses.

When the lens main body is connected to the camera main body by using the C mount or CS mount, the lens main body is optically and physically connected to the camera main body. Therefore, there is generally no electrical communication or power supply interface existing between the lens main body and the camera main body. According to the present invention, however, the power supply interface for the lens main body is formed via the network. Therefore, no external power supply is required, and specialized skills for setting the lens device become unnecessary by securing the power supply for the lens main body within the range of allowable voltage and allowable current of the power supply interface.

By start-controlling the lens main body independently from the camera main body based on the drive control signal from the central processing unit, it is possible to employ a configuration in which a plurality of lens main bodies are disposed on the network, and a plurality of lens mechanisms are synchronously drive-controlled or selectively drive-controlled based on the drive control signal from the central processing unit.

Since the lens main body is start-controlled independently from the camera main body based on the drive control signal from the central processing unit, it is possible to employ a configuration in which the plurality of lens main bodies are aggregated via the network to be connected to a single operation terminal or in which a plurality of operation terminals are connected to the network having the plurality of lens main bodies.

By securing the power supply for the lens main body within the range of allowable voltage and allowable current of the power supply interface, the user can easily perform routing and installation of the lens device without having specialized knowledge about the voltage and current.

BRIEF DESCRIPTION OF THE DRAWINGS

FIG. 1 is a functional block diagram illustrating a lens device according to an embodiment of the present invention.

FIGS. 2A and 2B illustrate functional block diagrams regarding examples of a network that connects a lens main body and an operation terminal in the embodiment of the present invention.

FIGS. 3A to 3H illustrate diagrams of a state where a USB is pulled out from the lens main body in the embodiment of the present invention, in which FIG. 3A is a perspective view of the lens main body viewed from a rear side, FIG. 3B is a left side view, FIG. 3C is a right side view, FIG. 3D is a front elevational view, FIG. 3E is a back view, FIG. 3F is a plan view, FIG. 3G is a bottom view, and FIG. 3H is a perspective view that is inverted by 180 degrees from FIG. 3A and viewed from the front.

FIGS. 4A to 4H illustrate diagrams of a state where Ethernet is pulled out from the lens main body in the embodiment of the present invention, in which FIG. 4A is a perspective view of the lens main body viewed from a rear side, FIG. 4B is a left side view, FIG. 4C is a right side view, FIG. 4D is a front elevational view, FIG. 4E is a back view, FIG. 4F is a plan view, FIG. 4G is a bottom view, and FIG. 4H is a perspective view that is inverted by 180 degrees from FIG. 4A and viewed from the front.

FIG. 5C is a side view illustrating a state where the lens main body according to the embodiment of the present invention is rotated by 90 degrees about the optical axis.

FIG. 6 is a functional block diagram illustrating a lens device according to another embodiment of the present invention.

FIG. 9 is a flowchart for describing a series of operations of lens mechanisms according to the embodiment of the present invention.

DETAILED DESCRIPTION

Figure 3A:
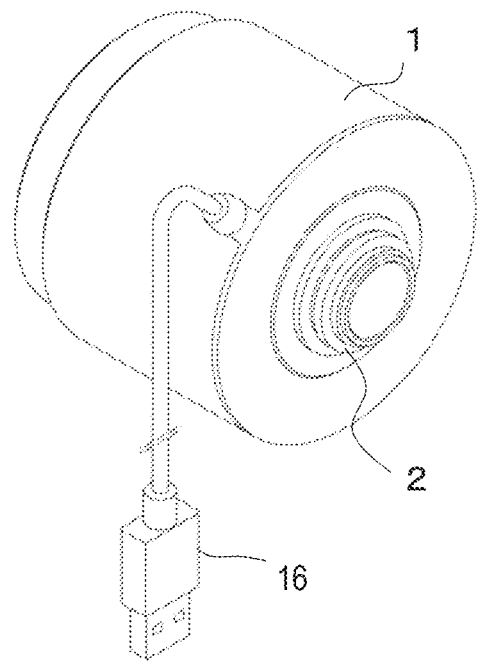

Hereinafter, embodiments of the present invention will be described in detail with reference to the accompanying drawings.

A general-purpose camera device is configured with: a lens main body for forming an optical image with a lens mechanism; and a camera main body that photoelectrically converts the optical image formed by the lens mechanism into image data of an electrical signal, performs image processing on the photoelectrically converted image data into a visible image, and displays the image-processed visible image on an operation screen.

The lens main body is configured to be connected to the camera main body by a mount such as a C mount or a CS mount.

The lens mechanism includes a lens that forms an optical image, and an iris (diaphragm). When capturing an optical image, the screen becomes too dark when brightness is insufficient at the time of image capturing, while blown-out highlights occur on the screen when it is too bright. Thus, the brightness adjustment function of the lens is the iris (diaphragm), and numerical values expressing the extent of the iris (diaphragm) is referred to as F-value.

The relation between the iris (diaphragm) and out-of-focus will be described. The focus range becomes expanded when the F-value is increased (the diaphragm is stopped down), while the focus range becomes smaller when the F-value is decreased (the diaphragm is opened). Therefore, it is possible to adjust the depth of field by adjusting the iris.

There are a manual iris and an auto iris as the types of the iris functions, and which method is to be used for image capturing is selected depending on the intended use purpose of the camera.

As for the manual iris, the user manually adjusts the diaphragm in accordance with the brightness of the image capturing place and the depth of field, so that it is necessary to do the adjustment in accordance with the brightness of the image capturing place and the like. Therefore, it is not suitable for a surveillance camera and the like placed outside.

As for the auto iris, the camera and the lens work in conjunction with each other to adjust the diaphragm automatically. Thus, the auto iris is optimal for the surveillance camera placed outside where the brightness changes depending on the time.

As the lens, a zoom lens, a varifocal lens, a single focus lens, and the like have been developed. The zoom lens is a lens that changes the focal length by simultaneously moving two or more lens groups without adjusting the focus. As for the zoom lens, while there is such a type in which the zoom magnification and the focus are adjusted manually, there is also a type that is capable of zooming in by a remote operation performed from an external device.

The varifocal lens is a lens with which the point becomes out of focus when the zoom magnification is changed, so that it is necessary to adjust the focus, that is, to change the focal length. The varifocal lens is a variable focal length lens capable of changing the focal length (angle of view), with which the image capturing range can be adjusted by changing the zoom magnification.

The angle of view is the range that can be captured by the camera device, and it is expressed with angles. With a wide angle, a wider range can be captured. However, the wider the angle is, the smaller the object becomes. In the meantime, a telephoto mode can zoom in and capture the object in a large form. However, the more it is zoomed in, the narrower the image capturing range becomes.

As it is clear from the description above, the varifocal lens is advantageous in respect that it is lower in cost and has improved F-values (easier to acquire bright images) compared to the zoom lens. In addition, the varifocal lens can be designed to be smaller and lighter compared to the zoom lens, and the autofocus performance thereof is becoming advanced as well. Because of those, not the zoom lens but the varifocal lens is often employed for the security and industrial cameras in recent years.

The single focus lens is a lens that is not provided with a structure for changing the focal length like those of the zoom lens and the focal lens described above.

Figure 5A:
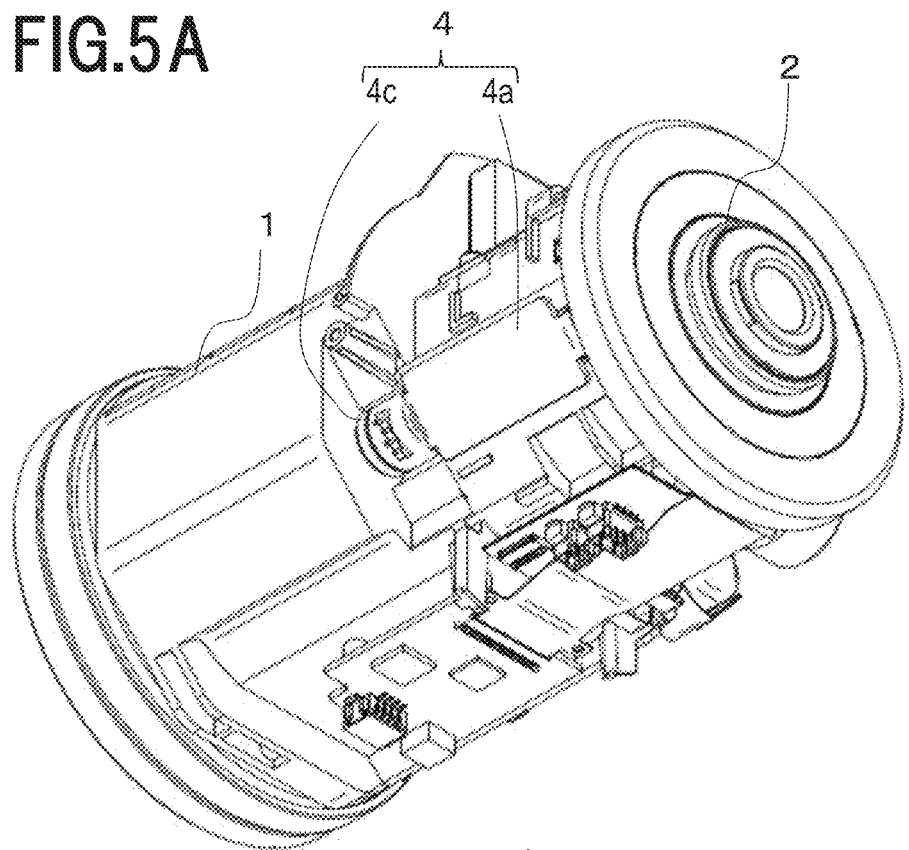
FIG. 5A is a perspective view illustrating the lens main body according to the embodiment of the present invention.
Figure 5B:
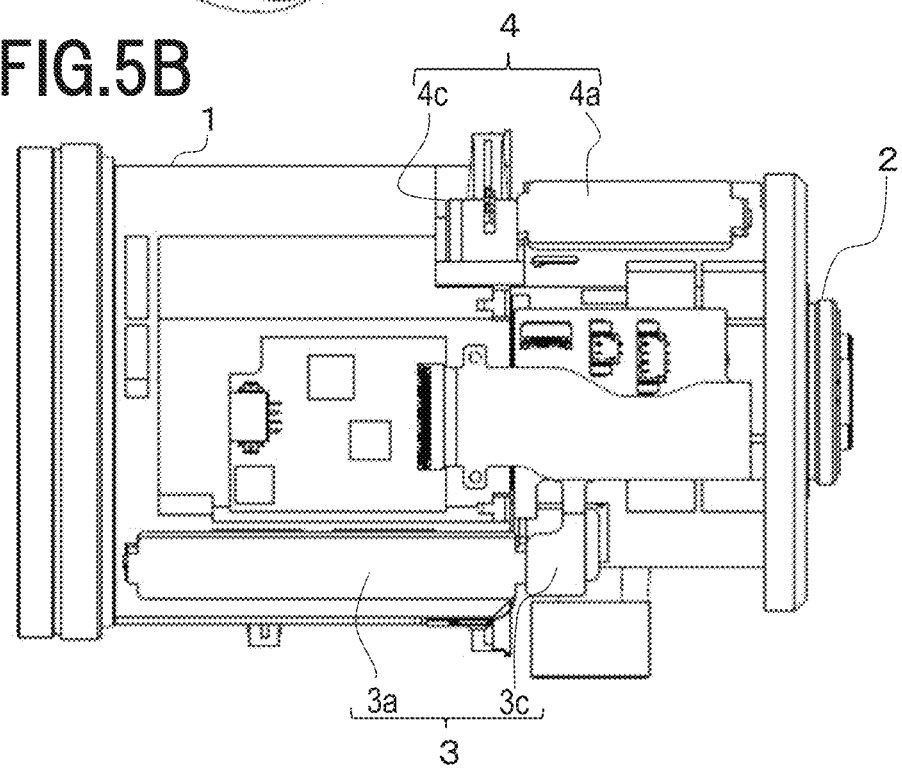
FIG. 5B is a side view illustrating the lens main body according to the embodiment of the present invention.

FIGS. 5A, 5B, and 5C are diagrams of a varifocal lens illustrating an example of a lens main body 1 according to the embodiment of the present invention. The focal lens illustrated in FIGS. 5A to 5C include a C mount or CS mount 2 provided on an end face of a lens main body 1, and the lens main body 1 is connected to a camera main body, not illustrated, by mounting the C mount or CS mount 2 to the camera main body, not illustrated. While a screw coupling type C mount or CS mount is used as the mount in FIGS. 5A to 5C, the mount is not limited thereto.

In the lens main body 1 illustrated in FIGS. 5A to 5C, mounted are: a zoom lead screw 3a and a zoom stepping motor 3c for changing the focal length by moving the lens; a focus lead screw 4a and a focus stepping motor 4c for focusing; and an iris unit 5a and an iris stepping motor 5c for changing the diaphragm F-value.

The zoom lead screw 3a and the zoom stepping motor 3c for changing the focal length by moving the lens configure a zoom adjustment lens mechanism 3 for performing zoom adjustment.

The lead screw 4a and the focus stepping motor 4c configure a focus adjustment lens mechanism 4 for performing focus adjustment.

The iris unit 5a and the iris stepping motor 5c for changing the diaphragm F-value configure an iris adjustment lens mechanism 5 for performing iris adjustment.

Those types of lens mechanisms 3, 4, and 5 are of a multi-purpose configuration (see Japanese Patent No. 5893746), and the present invention has no specific features in those types of lens mechanisms 3, 4, and 5, so that detailed descriptions thereof are omitted.

Furthermore, in the lens main body 1 illustrated in FIGS. 5A to 5C, an optical filter lens mechanism 6 or an extender lens mechanism 7 may also be mounted in some cases. The optical filter lens mechanism 6 is used in order to adjust the brightness of images, to improve the image contrast, to transmit or reflect a specific wavelength, or to divide a single image into two independent images with a specific branching ratio by driving the filter with a drive motor 6a. The extender lens mechanism 7 is mounted between the lens main body 1 (master lens) used in general and the camera main body, and it is used in order to extend the focal length of the master lens to 1.4 times, 2 times, or the like by driving the lens with a drive motor 7a. Those types of lens mechanisms 6 and 7 are of a multi-purpose configuration (see Japanese Patent No. 5893746), and the present invention has no specific features in those types of lens mechanisms 6 and 7, so that detailed descriptions thereof are omitted.

The lens main body 1 illustrated in FIG. 1 is optically and physically connected to a camera main body 69, when connected to the camera main body 69 via the C mount or CS mount 2. That is, there is only an optical and physical interface existing between the lens main body 1 and the camera main body 69 but no typical electrical communication or power supply interface existing therebetween. Therefore, it is necessary to secure the power supply for driving the lens main body 1 (lens mechanisms 3 to 7, the drive motors 3c, 4c, 5c, 6a, and 7a, drive control units 9 to 13, and a central processing unit 17 illustrated in FIG. 1).

The embodiment of the present invention is designed to secure at least the power supply. FIG. 1 is a functional block diagram illustrating a lens device according to the embodiment of the present invention. As illustrated in FIG. 1, the lens device according to the embodiment of the present invention is targeted at a lens device used for capturing optical images, and it includes: the lens mechanisms 3 to 7 built into the lens main body 1 for forming the optical image; the drive control units 9 to 13 built into the lens main body 1 for drive-controlling the lens mechanisms 3 to 7; the central processing unit 17 for outputting drive control signals to the drive control units 9 to 13; and a network 16 that forms a power supply interface 16a for the lens main body 1 and a communication interface 16b for the central processing unit 17.

In FIG. 1, the central processing unit 17 of the lens main body 1 and the network 16 are electrically connected via an interface of a connection board, and the connection board having a function of the interface is built into the lens main body 1. Since the connection board is built into the lens main body in the present invention, it is not necessary to be wired to the drive motors (the zoom drive motor 3c, the focus drive motor 4c, the iris drive motor 5c, the optical filter drive motor 6a, and the extender drive motor) to be used, so that specialized knowledge such as specifications and the like of the drive motors and skills thereof are not required.

The power supply interface 16a for the lens main body 1 and the communication interface 16b for the central processing unit 17 are formed with the network 16. Therefore, when the network 16 is established in the central processing unit 17 of the lens main body 1 and a central processing unit 20 of an operation terminal 15, the power supply for the lens main body 1 can be secured from a USB terminal of the operation terminal 15 within a range of allowable voltage and allowable current of the power supply interface 16a, that is, the network 16. As a result, no external power supply for driving the lens main body 1 is necessary, so that specialized skills for wiring work of the network 16 is not required.

As for the lens device of FIG. 1, illustrated is a case that is provided with the zoom adjustment lens mechanism 3, the focus adjustment lens mechanism 4, the iris adjustment lens mechanism 5, the optical filter adjustment lens mechanism 6, and the extender adjustment lens mechanism 7. However, it is not necessary to include all of the lens mechanisms 3 to 7. At least the focus adjustment lens mechanism 4 may need to be provided, and the zoom adjustment lens mechanism 3, the iris adjustment lens mechanism 5, the optical filter adjustment lens mechanism 6, or the extender adjustment lens mechanism 7 may be provided as necessary.

Furthermore, as illustrated in FIG. 1, the camera main body 69 has the lens main body 1 optically and physically connected via the C mount or CS mount 2, and it includes an imaging element 73 that photoelectrically converts the optical image formed by the lens mechanism 3 to 7 into electrical data. A data output unit 74 outputs the image data that is photoelectrically converted by the imaging element 73 as RAW (raw data).

A terminal 75 is provided, and the terminal 75 includes: an image processing unit 70 that performs image processing on the RAW data output from the data output unit 74 of the camera main body 69; and a display unit 71 that displays the data from the image processing unit 70 as a visible image.

Furthermore, as illustrated in FIG. 1, the operation terminal 15 is also provided. The operation terminal 15 includes: the central processing unit 20 that is connected to the central processing unit 17 of the lens main body 1 via the network 16; an allocation unit 21; and a data unit 22.

The allocation unit 21 is configured to: recognize the lens main body 1 based on a response signal from the central processing unit 17 for an inquiry made from the central processing unit 20 to the central processing unit 17 when the network 16 is established between the central processing unit 17 and the central processing unit 20; and allocates the drive control units 9 to 13 to the lens mechanism 3 to 7 of the recognized lens main body 1.

The data unit 22 is configured to output drive control signals, respectively, to the drive control units 9 to 13 allocated by the allocation unit 21.

The drive control signals from the data unit 22 are input to the central processing unit 17, and output from the central processing unit 17 to the corresponding drive control units 9 to 13, respectively.

Figure 3B:
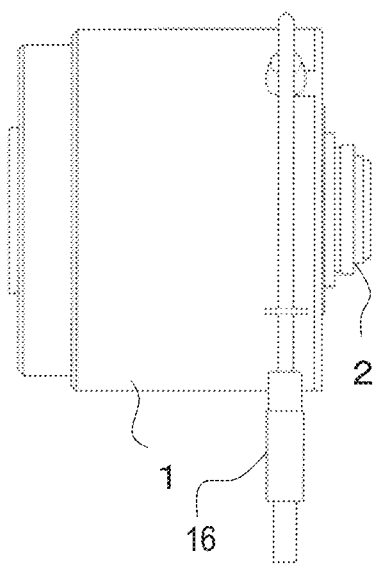
Figure 3C:
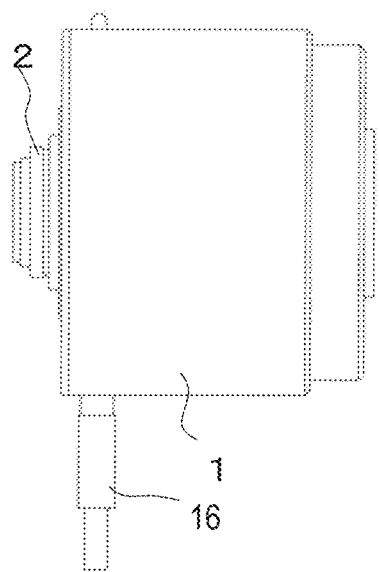
Figure 3D:
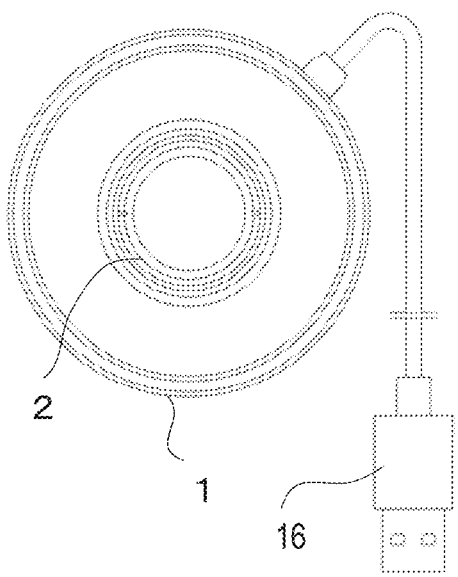
Figure 3E:
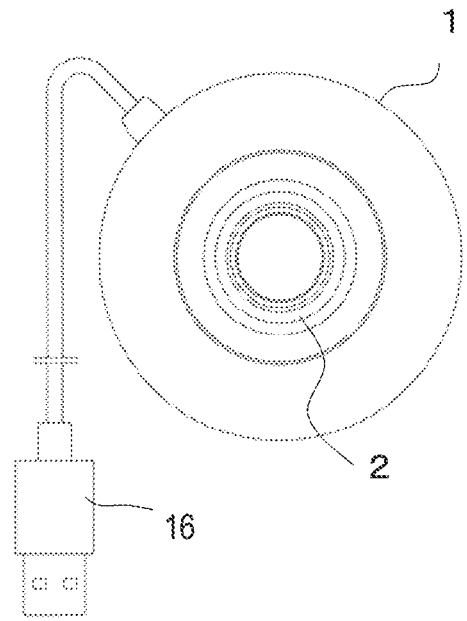
Figure 3F:
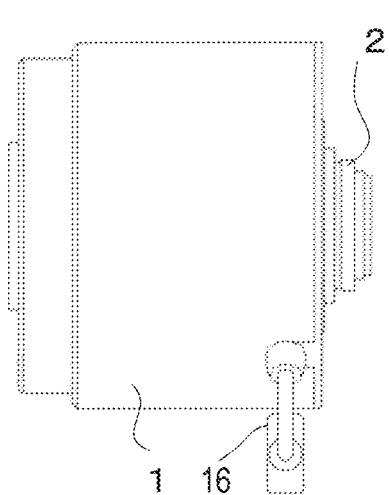
Figure 3G:
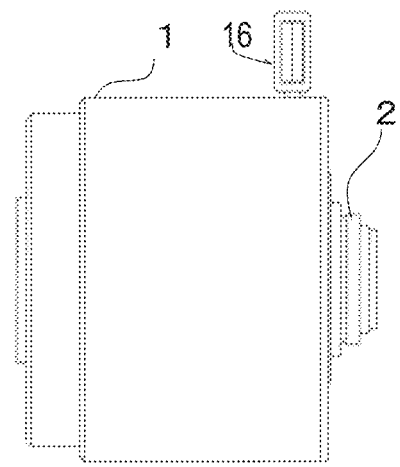
Figure 3H:
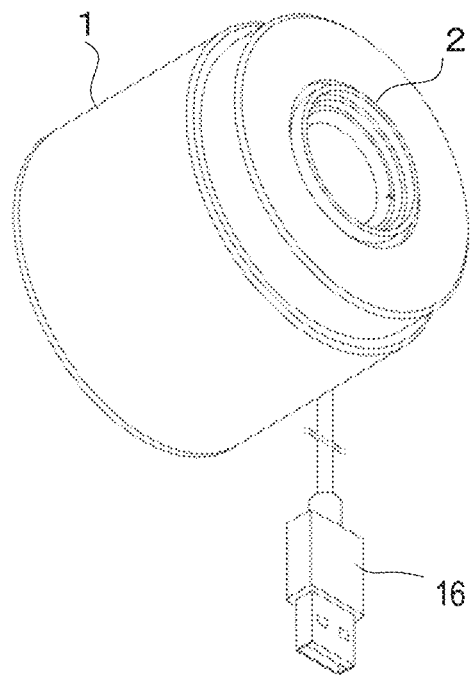

A configuration in which the USB (network) 16 is pulled out from the lens main body 1 is illustrated in FIGS. 3A to 3H. FIGS. 3A to 3H illustrate the state where the USB 16 is pulled out as the network 16 from the lens main body 1, in which FIG. 3A is a perspective view of the lens main body viewed from a rear side, FIG. 3B is a left side view, FIG. 3C is a right side view, FIG. 3D is a front elevational view, FIG. 3E is a back view, FIG. 3F is a plan view, FIG. 3G is a bottom view, and FIG. 3H is a perspective view that is rotated by 180 degrees from FIG. 3A and viewed from the front.

The lens device illustrated in FIGS. 3A to 3H is a camera lens device to be mounted to the camera main body, and it includes: the zoom adjustment lens mechanism 3 capable of performing zoom adjustment by a driving force of the drive motor 3c; the focus adjustment lens mechanism 4 capable of performing focus adjustment by a driving force of the drive motor 4c; and the iris adjustment lens mechanism 5 capable of performing adjustment of light amount (diaphragm) by a driving force of the drive motor 5c. The central processing unit 17 of a microcomputer capable of drive-controlling each of the drive motors 3c to 5c is built therein and, by connecting the operation terminal 15 as an external computer via the USB 16, each of the drive motors 3c, 4c, and 5c is drive-controlled from the external operation terminal 15 without going through the camera main body.

While the lens device illustrated in FIGS. 3A to 3H includes the zoom adjustment lens mechanism 3, the focus adjustment lens mechanism 4, and the iris adjustment lens mechanism 5, the lens device may simply include at least the focus adjustment lens mechanism 4.

Figure 4A:
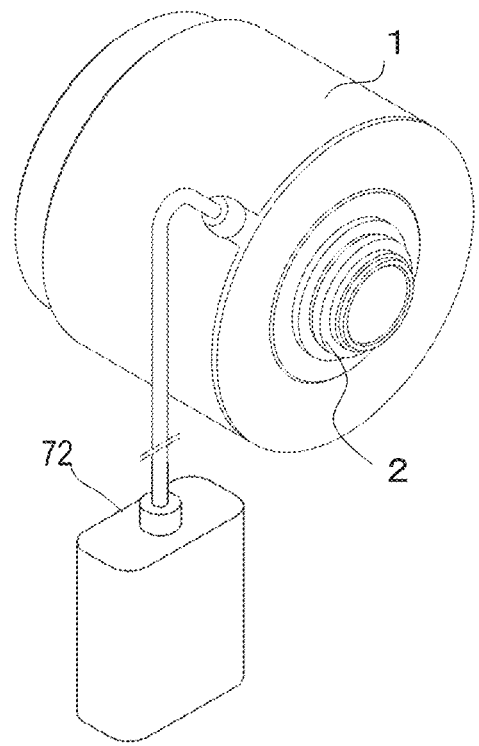
Figure 4B:
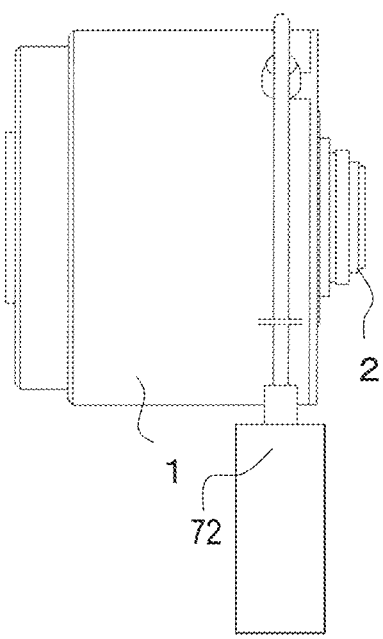
Figure 4C:
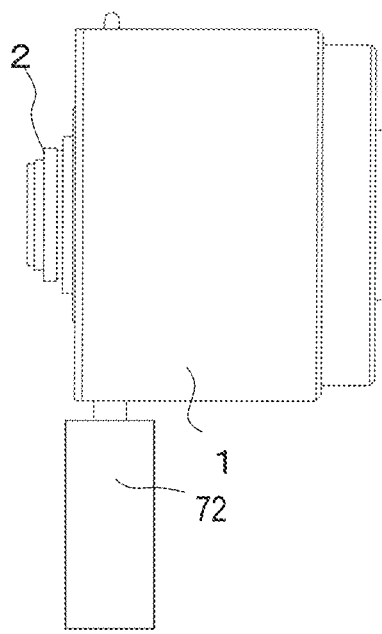
Figure 4D:
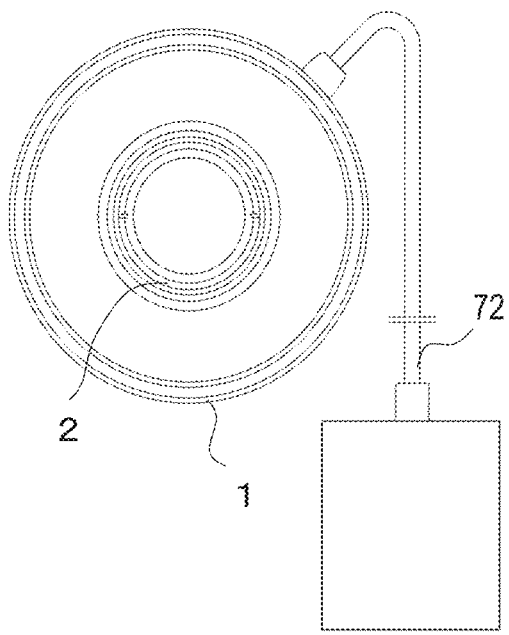

A configuration in which the Ethernet (network) 72 is pulled out from the lens main body 1 is illustrated in FIGS. 4A to 4H. FIGS. 4A to 4H illustrate the state where the Ethernet is pulled out as the network 16 from the lens main body 1, in which FIG. 4A is a perspective view of the lens main body viewed from a rear side, FIG. 4B is a left side view, FIG. 4C is a right side view, FIG. 4D is a front elevational view, FIG. 4E is a back view, FIG. 4F is a plan view, FIG. 4G is a bottom view, and FIG. 4H is a perspective view that is rotated by 180 degrees from FIG. 4A and viewed from the front.

The lens device illustrated in FIGS. 4A to 4H is a camera lens device to be mounted to the camera main body, and it includes: the zoom adjustment lens mechanism 3 capable of performing zoom adjustment by a driving force of the drive motor 3c; the focus adjustment lens mechanism 4 capable of performing focus adjustment by a driving force of the drive motor 4c; and the iris adjustment lens mechanism 5 capable of performing adjustment of light amount (diaphragm) by a driving force of the drive motor 5c. The central processing unit 17 of a microcomputer capable of drive-controlling each of the drive motors 3c to 5c is built therein and, by connecting the operation terminal 15 as an external computer via the Ethernet 72, each of the drive motors 3c, 4c, and 5c is drive-controlled from the external operation terminal 15 without going through the camera main body.

While the lens device illustrated in FIGS. 4A to 4H includes the zoom adjustment lens mechanism 3, the focus adjustment lens mechanism 4, and the iris adjustment lens mechanism 5, the lens device may simply include at least the focus adjustment lens mechanism 4.

FIG. 6 is a functional block diagram illustrating a lens device according to another embodiment of the present invention. As illustrated in FIG. 6, the lens main body 1 includes a lens information output unit 8 that outputs characteristic information indicating lens specifications regarding lens focal length and open diaphragm. The lens information output unit 8 is configured to send the characteristic information indicating the lens specifications to the operation terminal 15 via the central processing unit 17, the network 16, and the central processing unit 20.

A lens main body information output unit 14 illustrated in FIG. 6 outputs specification information for specifying the lens main body 1 to the operation terminal 15, the central processing unit 17, the network 16, and the central processing unit 20 without going through the camera main body. In a case where there are a plurality of lens main bodies 1, the lens main body information output unit 14 outputs, as the specification information, information that is allocated to each of the lens main bodies 1 for specification.

In FIG. 6, the central processing unit 17 of the lens main body 1 and the network 16 are electrically connected via an interface of a connection board, and the connection board having a function of the interface is built into the lens main body 1 of FIG. 6. Since the connection board is built into the lens main body in the present invention, it is not necessary to be wired to the drive motors (the zoom drive motor 3c, the focus drive motor 4c, the iris drive motor 5c, the optical filter drive motor 6a, and the extender drive motor) to be used, so that specialized knowledge such as specification of the drive motors and skills thereof are not required.

While the lens information output unit 8 for outputting the characteristic information and the lens main body information output unit 14 for outputting the specification information are separately provided in the embodiment illustrated in FIG. 6, it is also possible to mount the function of the lens information output unit 8 into the lens main body information output unit 14 such that the lens main body information output unit 14 outputs the specification information for specifying the lens main body 1 and the characteristic information indicating the specifications of the lens mechanisms.

The lens device illustrated in FIG. 6 includes: a temperature sensor 18 that is mounted to the lens main body 1 to measure the ambient temperature of the lens main body 1; and a temperature detection unit 19 that outputs information of the ambient temperature based on a measurement signal from the temperature sensor 18. The temperature information from the temperature detection unit 19 is output to the operation terminal 15 from the central processing unit 17 via the network 16.

The operation terminal of FIG. 6 (corresponding to the operation terminal 15 of FIG. 1) includes: the allocation unit 21 that directly recognizes the lens main body 1 based on the information (the specification information only or the characteristic information and the specification information) from the lens main body information output unit 14 or the information (characteristic information) from the lens information output unit 8 input via the network 16 without going through the camera main body, and allocates the drive control units 9 to 13 corresponding to the lens mechanism 3 to 7 of the recognized lens main body 1; the data unit 22 that outputs the drive control signals, respectively, to the allocated drive control units 3 to 7; and the central processing unit 20 that is connected to the central processing unit 17 of the lens main body 1 via the network 16 and exchanges the information among the allocation unit 21, the data unit 22, and the drive control units 3 to 7 as well as the lens main body information output unit 14 of the lens main body 1.

The allocation unit 21 (see FIG. 1) may recognize the lens main body 1 based on a response signal from the central processing unit 17 for an inquiry made from the central processing unit 20 to the central processing unit 17 via the network 16 that is established between the central processing unit 17 and the central processing unit 20, based on the characteristic information, or based on the specification information, and may allocate the drive control units 9 to 13 to the lens mechanisms 3 to 7 of the recognized lens main body 1.

The zoom drive control unit 9, the focus drive control unit 10, the iris drive control unit 11, the optical filter drive control unit 12, the extender drive control unit 13, the camera main body, the lens information output unit 8, the lens main body information output unit 14, and the temperature detection unit 19 exchange the information between the allocation unit 21 and the data unit 22 of the operation terminal 15 through the route of the central processing unit 17, the network 16, and the central processing unit 20.

Figure 7:
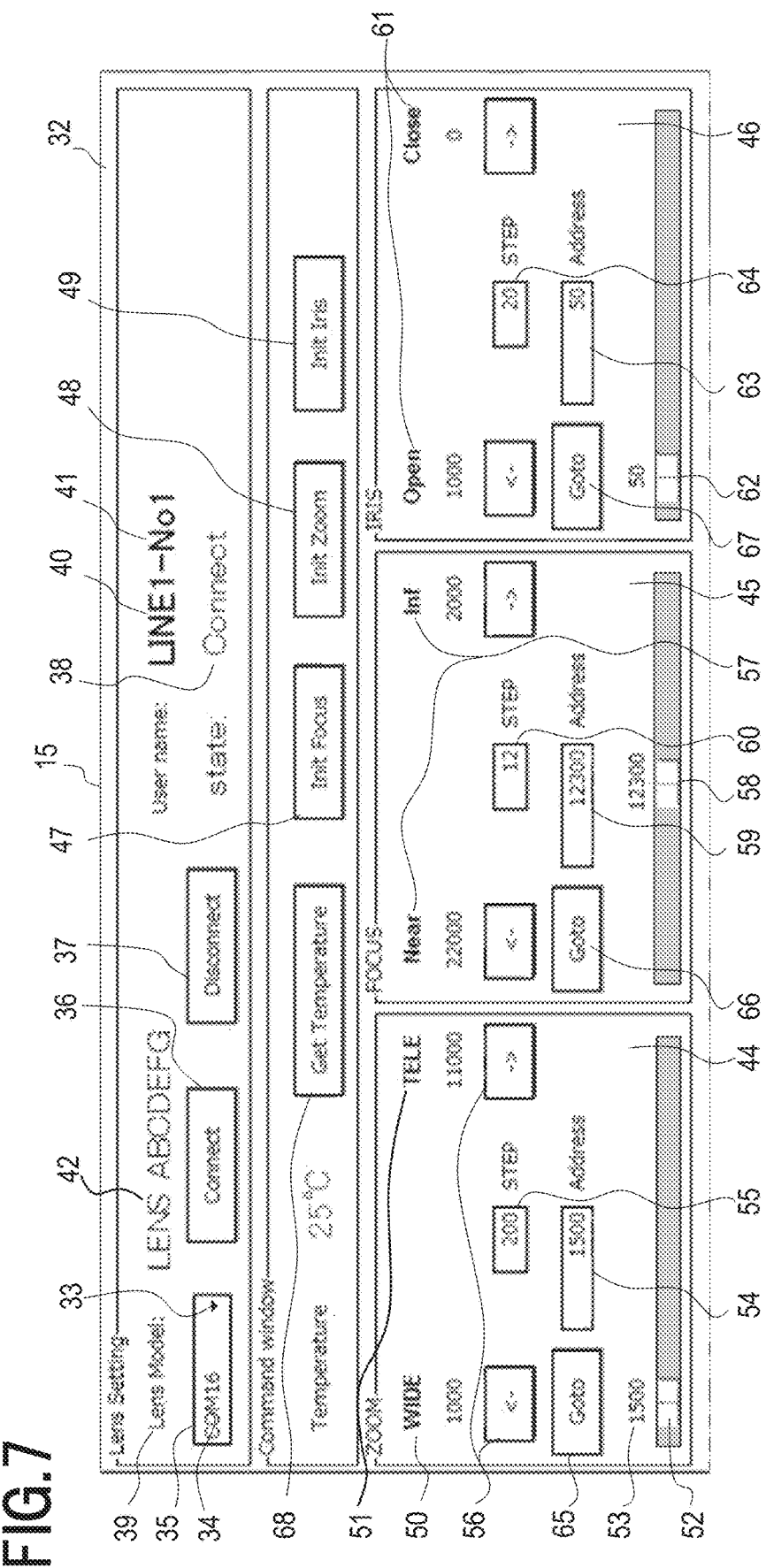
FIG. 7 is a diagram illustrating a display example of an operation screen of an operation terminal according to the embodiment of the present invention.
Figure 8:
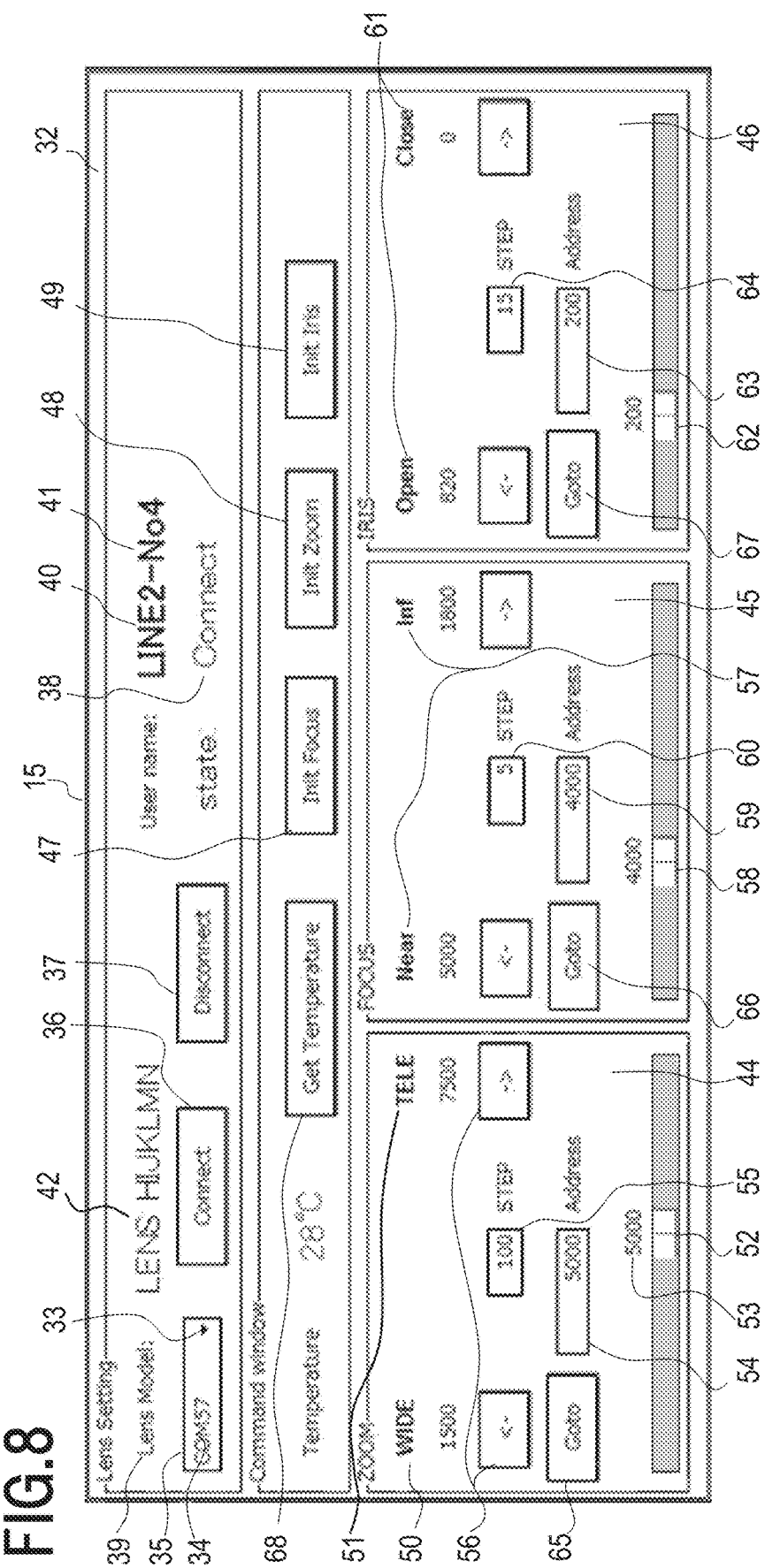
FIG. 8 is a diagram illustrating a state where the operation screen of the operation terminal corresponding to the lens main body illustrated in FIGS. 3A to 3H according to the embodiment of the present invention is switched to an operation screen of the operation terminal corresponding to another lens main body.

The allocation unit 21 and the data unit 22 illustrated in FIG. 1 are configured to be operated by an operation on an operation screen of the operation terminal 15. As illustrated in FIGS. 7 and 8, on an operation screen 32 of the operation terminal 15, disposed are: an operation button 33 for operating the allocation unit 21; and a display window 35 for displaying selection information 34 of the lens main body 1 that is individually authenticated by the allocation unit 21.

As illustrated in FIGS. 7 and 8, on the operation screen 32 of the operation terminal 15, provided next to each other are: a connection button 36 that connects the lens main body 1 on the network 16 recognized by the allocation unit 21 to the operation terminal 15 via an OS; a disconnection button 37 that disconnects the lens main body 1 connected by the connection button 36 from the operation terminal 15 via the OS; and a display window 38 that displays the operation state of the connection button 36 and the disconnection button 37.

In addition to the selection information 34 of the lens main body 1, the specification information for specifying the lens main body 1 includes a lens model 39 such as zoom lens, varifocal lens, and single focal lens, information of a line 40 to which a plurality of lens main bodies 1 are connected, positional information 41 indicating each lens main body 1 on the line 40, and the like. The allocation unit 21 as illustrated in FIGS. 7 and 8 are configured to: recognize each of the lens main bodies 1 based on the specific information for specifying the lens main bodies 1 or based on the specification information and the characteristic information; display the selection information (specification information) 34 of the lens main body 1 in the display window 35; display the lens model (characteristic information) 39 in a display window 42; and display the information (specification information) of the line 40 and the positional information (specification information) 41 in an associated manner. In FIGS. 7 and 8, the line to which a plurality of lens main bodies 1 are connected is determined based on the information of the line 40, and the order of the lens main body 1 on the line 40 is displayed based on the positional information 41. However, the configuration thereof is not limited to such a display example.

As illustrated in FIGS. 7 and 8, data units respectively outputting drive control signals for the drive control units 9 to 13 of the lens main body 1 are mounted onto the operation screen 32 of the operation terminal 15. As the data unit 22 illustrated in FIG. 1, provided are: a zoom data unit 44 that outputs a drive control signal for drive-controlling the zoom adjustment lens mechanism 3; a focus data unit 45 that outputs a drive control signal for drive-controlling the focus adjustment lens mechanism 4; and an iris data unit 46 that outputs a drive control signal for drive-controlling the iris adjustment lens mechanism 5. Note that a data unit that outputs a drive control signal to the optical filter adjustment lens mechanism 6 and a data unit that outputs a drive control signal to the extender adjustment lens mechanism 7 may also be added.

As illustrated in FIGS. 7 and 8, on the operation screen 32 of the operation terminal 15, initialization buttons 47, 48, and 49 for the data units for switching and initializing the zoom data unit 44, the focus data unit 35, and the iris data unit 46 are mounted.

As the zoom drive motor 3c, the focus drive motor 4c, and the iris drive motor 5c illustrated in FIG. 1, stepping motors 3c, 4c, and 5c are used in the lens main body 1 of FIG. 5. Stepping motors may also be used as the optical filter drive motor 6a and the extender drive motor 7a illustrated in FIG. 1. For those drive motors 3c, 4c, 5c, 6a, and 7a, DC motors may also be used instead of the stepping motors. Furthermore, the stepping motor and the DC motor may be used together in accordance with the intended use purpose.

As for the operation terminal 15 illustrated in FIGS. 7 and 8, it is assumed to use the stepping motors for the drive motors 3c, 4c, and 5c. The zoom data unit 44 is configured to: display characteristic information 50 of a wide-angle side focal length address and characteristic information 51 of a telephoto-side focal length address among the focal lengths of the lens main body 1 recognized by the allocation unit 21; and display focal length address information 53, 54 changed by sliding a zoom slide bar 52 within a range of the focal length addresses 50, 51. Furthermore, the zoom data unit 44 is configured to display step number information 55 for performing fine adjustment of the focus from the position of the address information 54.

In FIGS. 7 and 8, illustrated is a case where the focal length address is changed to the position of 1500 by the zoom slide bar 52. When the zoom slide bar 52 is slid to the position of the focal length address 1500, the number "1500" is displayed as the address information 54, and the step number information 55 for performing fine adjustment of the focus is displayed by operating a step operation button 56. The step number decreases when the step operation button 56 on the left side of the drawings is operated, and the step number increases when the step operation button 56 on the right side of the drawings is operated.

In the example illustrated in FIGS. 7 and 8, it is assumed to use the varifocal lens as the lens of the lens main body 1, so that the focal position of the lens is shifted when zoomed in by the zoom adjustment lens mechanism 3. Therefore, it is necessary to correct the focal position of the lens again. The focus data unit 45 is configured to: display near point and far point focus address information (characteristic information) 57 corresponding to the focal length (characteristic information) zoomed in by the zoom adjustment lens mechanism 3; and display address information 59 indicating the focal position by sliding a focus slide bar 58 within the range of the focus address information 57. Furthermore, the focus data unit 45 is configured to display information 60 of the step number for performing fine adjustment of the focus.

In the example illustrated in FIGS. 7 and 8, the iris may be adjusted for adjusting the brightness through the lens. The iris data unit 46 is configured to: display iris information (characteristic information) 61 of the maximum diaphragm value (fully open) and the minimum diaphragm value (fully closed) in iris adjustment; and display address information 63 indicating the open/close position of the diaphragm by sliding an iris slide bar 62 within the range of the iris information 61. Furthermore, the iris data unit 46 is configured to display information 64 of the step number for performing fine adjustment of the open/close position of the diaphragm.

While the focal length of the zoom, the focal position of the focus, the open/close degree of the iris are displayed as the address information, the focal length and the F-value may be displayed instead of the address information.

The operation terminal 15 illustrated in FIGS. 7 and 8 includes execution buttons 65, 66, and 67 mounted on the operation screen 32 for operating the zoom data unit 44, the focus data unit 45, and the iris data unit 46 to output drive control signals. When the execution buttons 65, 66, and 67 are operated, the zoom data unit 44, the focus data unit 45, and the iris data unit 46 drive-control the zoom adjustment lens mechanism 3 (the zoom drive control unit 9, the zoom drive motor 3c), the focus adjustment lens mechanism 4 (the focus drive control unit 10, the focus drive motor 4c), and the iris adjustment lens mechanism 5 (the iris drive control unit 11, the iris drive motor 5c) by corresponding to the zoom address information (for example, position of 1500), the focus address information (for example, position of 12300), and the iris information (for example, position of 50).

As illustrated in FIGS. 7 and 8, a temperature acquisition start button 68 for acquiring temperature information from the temperature detection unit 19 received at the central processing unit 20 is mounted on the operation screen 32 of the operation terminal 15 so as to acquire the ambient temperature information of the lens main body 1 by operating the start button 68.

The configuration of the network 16 connecting the lens main body 1 and the operation terminal 15 will be described by referring to FIGS. 2A and 2B. FIG. 2A illustrates a case where the lens main body 1 and the operation terminal 15 are connected via the network 16 in an n-to-one connection mode, and FIG. 2B illustrates a case where the lens main body 1 and the operation terminal 15 are connected via the network 16 in an n-to-n connection mode.

As illustrated in FIG. 1, by forming the power supply interface 16a for the lens main body 1 and the communication interface 16b for the central processing unit 17 by the network 16, the lens main body 1 is independently start-controlled from the camera main body 69 based on the drive control signal from the central processing unit 17. Thus, as illustrated in FIGS. 2A and 2B, a plurality of lens main bodies 1 are disposed on the network 16, and the lens mechanisms A and B are synchronously drive-controlled or selectively drive-controlled from a plurality of lens mechanisms 3 to 7 based on the drive control signal from the central processing unit 17.

FIG. 2A builds a configuration in which a plurality of lens main bodies 1 are aggregated and connected to a single operation terminal by the network 16. The connection mode illustrated in FIG. 2A indicates a six-to-one connection mode in which six lens main bodies 1 are connected to a single operation terminal 15. As illustrated in FIG. 2A, three lens main bodies 1 are connected in parallel to network hubs 23 and 24, respectively, and the two network hubs 23 and 24 are connected in parallel to a network hub 25 to build the six-to-one network 16. The network hubs 23, 24, and 25 configure the network 16 of FIG. 1. The network hubs 23 and 24 are the type capable of supplying the power.

With the network 16 illustrated in FIG. 2A, n-pieces of lens main bodies 1 are collectively drive-controlled by a single operation terminal 15.

FIG. 2B builds a configuration in which a plurality of operation terminals 15 are connected to the network 16 having a plurality of lens main bodies 1, which indicates a case where the lens main bodies 1 and the operation terminals 15 are connected via the network 16 of an n-to-n connection mode.

FIG. 2C builds the n-to-n network 16 between the n-pieces of lens main bodies 1 and the n-pieces of operation terminals 15 by connecting the n-pieces of lens main bodies 1 to the n-pieces of operation terminals 15 via the network 16 configured with the network hub 25 and the Ethernet 72.

With the network 16 illustrated in FIG. 2B, it is possible to have a control system that drive-controls the n-pieces of lens main bodies 1 by a single operation terminal 15 among the n-piece of operation terminals 15, or it is possible to have a control system that drive-controls a single lens main body 1 by a single corresponding operation terminal 15 by allocating the n-pieces of operation terminals 15 to the n-pieces of lens main bodies 1, respectively.

Furthermore, it is also possible to build a new control system in which "n−1" pieces of operation terminals 15 among the n-pieces thereof may be placed in a control chamber, a mobile terminal such as a smartphone or a tablet is used as the remaining operation terminal 15, and the mobile terminal is carried to the vicinity of the lens main body 1 to drive-control the lens main body 1 with the mobile terminal.

The network 16 connecting the lens main body 1 to the operation terminal 15 is not limited to the wiring structure illustrated in FIGS. 2A and 2B. As illustrated in FIGS. 3A to 3H and 4A to 4H, the USB or the Ethernet 72 may be pulled out from the central processing unit 17 of FIG. 1, and the USB or the Ethernet 72 may be connected to the central processing unit 20 of the operation terminal 15 as the network 16 of FIG. 1.

Next, a series of operations from selection of the lens main body 1 to temperature management will be described by referring to FIGS. 7, 8, and 9. First, the lens main body 1 provided with the lens mechanism 3 to 7 having the focal length and open diaphragm optimal for being mounted to a surveillance or industrial-use camera device is selected (Step S1 of FIG. 9).

The display examples of FIGS. 7 and 8 illustrate the case where a plurality of lens main bodies 1 are connected to a single operation terminal 15 via the network 16, and assumed is a case where a plurality of lens main bodies 1 exist on a single line 40 (the network 16).

In addition to the selection information (specification information) 34 of the lens main body 1, the specification information for specifying the lens main body 1 includes the lens model (specification information) 39 such as the zoom lens, varifocal lens, and single focal lens, information of the line 40 (specification information) to which a plurality of lens main bodies 1 are connected, information (specification information) indicating each of the lens main bodies 1 on the line 1 with the order 41, and the like.

First, the operation button 33 on the operation terminal 15 illustrated in FIGS. 7 and 8 is operated to select a single lens main body 1 from the lens main bodies 1 on the line 40 (Step S1 of FIG. 9). As will be described later, the selection information 34 of the selected lens main body 1 is displayed in the display window 35 by the allocation unit 21.

Then, the connection button 36 illustrated in FIGS. 7 and 8 is operated to connect the lens main body 1 corresponding to the selection information 34 selected from those on the line 40 (the network 16) from the operation terminal 15 via the OS in terms of software (Step S2 of FIG. 9). In this state, only the selected lens main body 1 is the operation target of the operation terminal 15. In the meantime, the other lens main bodies 1 simply exist on the line 40, that is, on the network 16 and not connected to the operation terminal 15 in terms of software, so that those are not the operation target of the operation terminal 15.

When switching the lens main body 1 on the line 40, that is, on the network 16, the disconnection button 37 is operated to disconnect the lens main body 1 corresponding to the selection information 34 from the operation terminal 15 via the OS in terms of software. Then, the operation button 33 on the operation terminal 15 illustrated in FIGS. 7 and 8 is operated to select the switching-target lens main body 1 from the lens main bodies 1 on the line 40 (Step S1 of FIG. 9). The new selection information 34 of the selected lens main body 1 is displayed in the display window 35 by the allocation unit 21.

Then, the connection button 36 illustrated in FIGS. 7 and 8 is operated to connect the lens main body 1 corresponding to the selection information 34 newly selected from those on the line 40 (the network 16) from the operation terminal 15 via the OS in terms of software (Step S2 of FIG. 9). In this state, only the newly selected lens main body 1 is the operation target of the operation terminal 15. In the meantime, the other lens main bodies 1 including the disconnected lens main body 1 simply exist on the line 40, that is, on the network 16 and not connected to the operation terminal 15 in terms of software, so that those are not the operation target of the operation terminal 15.

When the lens main body 1 is connected to the operation terminal 15 in terms of software, the characteristic information indicating the specifications of the lens mechanisms 3 to 5 is output from the lens information output unit 8 of the lens main body 1 illustrated in FIG. 6 via the network 16, and the specification information for specifying the lens main body 1 is output from the lens main body information output unit 14 of FIG. 6 via the network 16.

The allocation unit 21 of the operation terminal 15 illustrated in FIGS. 7 and 8 individually recognizes the lens main body 1 based on the characteristic information output from the lens information output unit 8 and the specification information output from the lens main body information output unit 14 illustrated in FIG. 6, displays the lens model 39 of the lens main body 1 in the display window 42, and displays the information of the line 40 and the information of the order 41 in an associated manner.

Referring to FIG. 7, it is displayed on the operation screen 32 that the lens main body 1 having the selection information 34 of "COM16" is selected from the line 40, that is, from the network 16, the lens model 39 thereof is "LENS ABCDEFG", and the selected lens main body 1 corresponds to "No1" that is the order 41 on the line 40 (the network 16).

FIG. 8 illustrates a display example of a case where the lens main body 1 having the selection information 34 of "COM16" is disconnected from the operation terminal 15 in terms of software, and the lens main body 1 having the selection information 34 of "COM57" is selected anew from the line 40, that is, from the network 16. It is displayed on the operation screen 32 that the lens model 39 of the lens main body 1 selected from the line 40, that is, form the network 16 is "LENS HIJKLMN", and the selected lens main body 1 corresponds to "No4" that is the order 41 on the line 40 (the network 16).

The operator grasps that the lens model 39 of the lens main body 1 selected by the operation button 33 and the connection button 36 illustrated in FIGS. 7 and 8 is "LENS ABCDEFG" or "LENS HIJKLMN" and that the order 41 on the line 40 (the network 16) is "No1" or "No4", based on the display on the operation screen 32 indicated in FIGS. 7 and 8.

At the point where lens selection and lens connection processing indicated in FIG. 9 is completed, the initialization buttons 47, 48, and 49 of the operation terminal 15 illustrated in FIGS. 7 and 8 are operated to initialize the lens mechanism 3, 4, and 5 (Step S3 of FIG. 9).

Hereinafter, initialization processing will be described for each of the zoom adjustment lens mechanism 3, the focus adjustment lens mechanism 4, the iris adjustment lens mechanism 5, the optical filter adjustment lens mechanism 6, and the extender adjustment lens mechanism 7.

When the operator operates the zoom initialization button 48 on the operation screen 32 of the operation terminal illustrated in FIGS. 7 and 8, the allocation unit 21 allocates the zoom drive control unit 9 to the zoom adjustment lens mechanism 3, that is, activates the zoom data unit 44 corresponding to the zoom drive control unit 9 of the zoom adjustment lens mechanism 3.

The zoom data unit 44 issues a command for initializing the zoom adjustment lens mechanism 3 to the zoom drive control unit 9 allocated by the allocation unit 21 (Step S3 and Step S10 of FIG. 9), reads the current value (the characteristic information) of the zoom adjustment lens mechanism 3 based on the command (Step S3 and Step S11 of FIG. 9), and reads information (characteristic information) indicating the operation range of information 50 on the WIDE-side and information 51 on the TELE-side of the zoom adjustment lens mechanism 3 (Step S3 and Step S12 of FIG. 9).

The zoom data unit 44 displays the read current value of the zoom adjustment lens mechanism 3 as the characteristic information 53, 54 on the operation screen 32 of the operation terminal 15 (Step S11 of FIG. 9), and displays the information 50, 51 indicating the operation range of the zoom adjustment lens mechanism 3 (Step S12 of FIG. 9).

When a series of processing regarding initialization of the zoom adjustment lens mechanism 3 is completed, a series of initialization processing regarding the focus adjustment lens mechanism 4 is started.

When the operator operates the focus initialization button 47 on the operation screen 32 of the operation terminal illustrated in FIGS. 7 and 8, the allocation unit 21 allocates the focus drive control unit 10 to the focus adjustment lens mechanism 4, that is, activates the focus data unit 45 corresponding to the focus drive control unit 10 of the focus adjustment lens mechanism 4.

The focus data unit 45 issues a command for initializing the focus adjustment lens mechanism 4 to the focus drive control unit 10 allocated by the allocation unit 21 (Step S3 and Step S13 of FIG. 9), reads the current value (the characteristic information) of the focus adjustment lens mechanism 4 based on the command (Step S3 and Step S14 of FIG. 9), and reads information 57 (characteristic information) indicating the operation range of NEAR-side and Inf-side of the focus adjustment lens mechanism 4 (Step S3 and Step S15 of FIG. 9).

The focus data unit 45 displays the read current value of the focus adjustment lens mechanism 4 as the characteristic information 58, 59 on the operation screen 32 of the operation terminal 15 (Step S3 and Step S14 of FIG. 9), and displays the information 57 indicating the operation range of the focus adjustment lens mechanism 4 (Step S15 of FIG. 9).

When a series of processing regarding initialization of the focus adjustment lens mechanism 4 is completed, a series of initialization processing regarding the iris adjustment lens mechanism 5 is started.

When the operator operates the iris initialization button 49 on the operation screen 32 of the operation terminal illustrated in FIGS. 7 and 8, the allocation unit 21 allocates the iris drive control unit 11 to the iris adjustment lens mechanism 5, that is, activates the iris data unit 46 corresponding to the iris drive control unit 11 of the iris adjustment lens mechanism 5.

The iris data unit 46 issues a command for initializing the iris adjustment lens mechanism 5 to the iris drive control unit 11 allocated by the allocation unit 21 (Step S3 of FIG. 9), reads the current value (the characteristic information) of the iris adjustment lens mechanism 5 based on the command (Step S3 of FIG. 9), and reads information 61 (characteristic information) indicating the operation range of Open-side and Close-side of the iris adjustment lens mechanism 5 (Step S3 of FIG. 9).

The iris data unit 46 displays the read current value of the iris adjustment lens mechanism 5 as the characteristic information in the display windows 62 and 63 on the operation screen 32 of the operation terminal 15 (Step S3 of FIG. 9), and displays the information 61 indicating the operation range of the iris adjustment lens mechanism 5 (Step S3 of FIG. 9).

When a series of processing regarding initialization of the iris adjustment lens mechanism 5 is completed, a series of initialization processing regarding the optical filter adjustment lens mechanism 6 is then started (Steps S3 and S17 of FIG. 9), and a series of initialization processing regarding the extender adjustment lens mechanism 7 is started thereafter (Steps S3 and S18 of FIG. 9). Thereby, a series of initialization processing for capturing an optical image is completed.

In a case where the ambient temperature information of the lens main body 1 is necessary, initialization processing of the temperature sensor 18 and the temperature detection unit 19 is executed (Steps S3 and S19 of FIG. 9).

When the series of initialization processing described above is completed, an optical image is captured by drive-controlling each of the lens mechanisms 3, 4, 5, 6, and 7. An operation for drive-controlling the drive motors $3c$, $4c$, $5c$, $6a$, and $7a$ of each of the lens mechanisms 3, 4, 5, 6, and 7 and an operation for acquiring the temperature information will be described by referring to FIGS. 1 and 10.

Figure 10A:
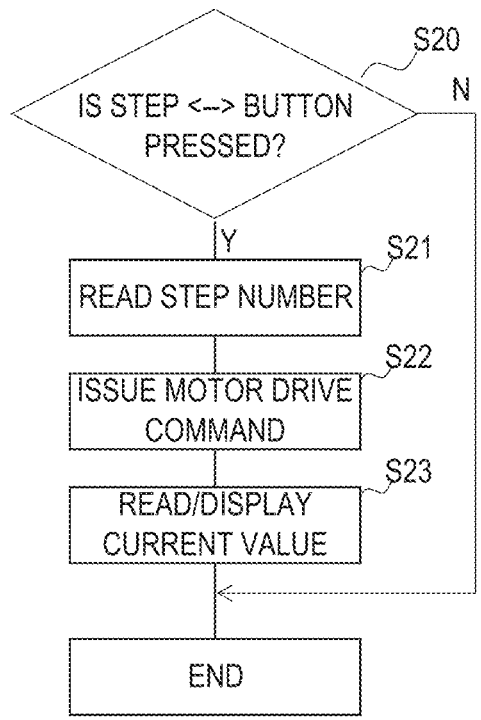
FIGS. 10A to 10D are flowcharts for describing operations of drive motors that drive respective lens mechanisms according to the embodiment of the present invention.

As illustrated in FIG. 10A, when the step operation button 56 of the zoom data unit 44, the focus data unit 45, and the iris data unit 46 is operated (YES at Step 20 of FIG. 10A), the zoom data unit 44, the focus data unit 45, and the iris data unit 46 read the step number displayed in the display windows 55, 60, and 64 (Step S21 of FIG. 10A).

Upon reading the step number displayed in the display windows 55, 60, and 64, the zoom data unit 44, the focus data unit 45, and the iris data unit 46 issue a command corresponding to the read step number (Step S22 of FIG. 10A).

Specifically, the zoom data unit 44 issues a command for drive-controlling the zoom drive motor $3c$ of the zoom adjustment lens mechanism 3 to the zoom drive control unit 9 by corresponding to the read step number (Step S22 of FIG. 10A).

Upon receiving the command corresponding to the read step number from the zoom data unit 44, the zoom drive control unit 9 executes zoom adjustment of the zoom adjustment lens mechanism 3 by drive-controlling the zoom drive motor 3c based on the command.

The focus data unit 45 issues a command for drive-controlling the focus drive motor 4c of the focus adjustment lens mechanism 4 to the focus drive control unit 10 by corresponding to the read step number (Step S22 of FIG. 10A).

Upon receiving the command corresponding to the read step number from the focus data unit 45, the focus drive control unit 10 executes focus adjustment of the focus adjustment lens mechanism 4 by drive-controlling the focus drive motor 4c based on the command.

The iris data unit 46 issues a command for drive-controlling the iris drive motor 5c of the iris adjustment lens mechanism 5 to the iris drive control unit 11 by corresponding to the read step number (Step S22 of FIG. 10A).

Upon receiving the command corresponding to the read step number from the iris data unit 46, the iris drive control unit 11 executes iris adjustment of the iris adjustment lens mechanism 5 by drive-controlling the iris drive motor 5c based on the command.

In a case of having the optical filter adjustment lens mechanism 6 and the extender adjustment lens mechanism 7 illustrated in FIG. 1, for drive-controlling the optical filter drive motor 6a of the optical filter adjustment lens mechanism 6 and the extender drive motor 7a of the extender adjustment lens mechanism 7, the optical filter data unit and the extender data unit are provided to the data unit 22 illustrated in FIG. 1 so as to drive-control the optical filter adjustment lens mechanism 6 and the extender adjustment lens mechanism 7.

Specifically, the optical filter data unit of the data unit 22 issues a command for drive-controlling the optical filter drive motor 6a of the optical filter adjustment lens mechanism 6 to the optical filter drive control unit 12 by corresponding to the read step number.

Upon receiving the command corresponding to the read step number from the optical filter data unit of the data unit 22, the optical filter drive control unit 12 executes adjustment of the optical filter adjustment lens mechanism 6 by drive-controlling the optical filter drive motor 6a based on the command.

The extender data unit of the data unit 22 issues a command for drive-controlling the extender drive motor 7a of the extender adjustment lens mechanism 7 to the extender drive control unit 13 by corresponding to the read step number.

Upon receiving the command corresponding to the read step number from the extender data unit of the data unit 22, the extender drive control unit 13 executes magnification adjustment of the extender adjustment lens mechanism 7 by drive-controlling the extender drive motor 7a based on the command.

The zoom data unit 44 reads the current zoom value of the zoom adjustment lens mechanism 3 after the zoom adjustment of the zoom adjustment lens mechanism 3 is completed, and displays the zoom value as the address information 53, 54 on the operation screen 32 of the operation terminal 15 (Step S23 of FIG. 10A).

The focus data unit 45 reads the current focus value of the focus adjustment lens mechanism 4 after the focus adjustment of the focus adjustment lens mechanism 4 is completed, and displays the focus value as the address information 58, 59 on the operation screen 32 of the operation terminal 15 (Step S23 of FIG. 10A).

The iris data unit 46 reads the current iris value of the iris adjustment lens mechanism 5 after the iris adjustment of the iris adjustment lens mechanism 5 is completed, and displays the iris value as the address information 62, 63 on the operation screen 32 of the operation terminal 15 (Step S23 of FIG. 10A).

The optical filter data unit of the data unit 22 reads the current value of the optical filter adjustment lens mechanism 6 after the adjustment of the optical filter adjustment lens mechanism 6 is completed, and displays the value as the address information on the operation screen 32 of the operation terminal 15 (Step S23 of FIG. 10A).

The extender data unit of the data unit 22 reads the current value of the extender adjustment lens mechanism 7 after the adjustment of the extender adjustment lens mechanism 7 is completed, and displays the value as the address information on the operation screen 32 of the operation terminal 15 (Step S23 of FIG. 10A).

Next, operations of cases where the zoom slide bar 52, the focus slide bar 58, and the iris slide bar 62 are operated on the slide bars will be described by referring to FIG. 10B.

Figure 10B:
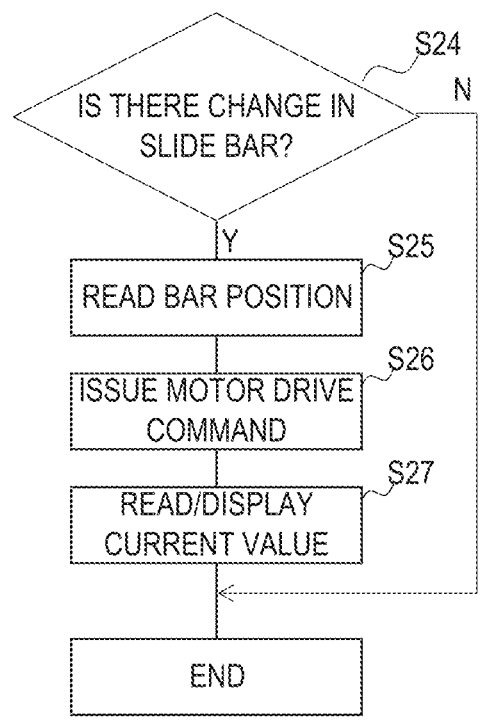

The zoom data unit 44 reads the position of the zoom slide bar 52 on the slide bar (Step S25 of FIG. 10B), and issues a command for drive-controlling the zoom drive motor 3c of the zoom adjustment lens mechanism 3 to the zoom drive control unit 9 by corresponding to the position of the zoom slide bar 52 (Step S26 of FIG. 10B).

Upon receiving the command corresponding to the position of the zoom slide bar 52 from the zoom data unit 44, the zoom drive control unit 9 executes zoom adjustment of the zoom adjustment lens mechanism 3 by drive-controlling the zoom drive motor 3c based on the command.

The focus data unit 45 reads the position of the focus slide bar 58 on the slide bar (Step S25 of FIG. 10B), and issues a command for drive-controlling the focus drive motor 4c of the focus adjustment lens mechanism 4 to the focus drive control unit 10 by corresponding to the position of the focus slide bar 58 (Step S26 of FIG. 10B).

Upon receiving the command corresponding to the position of the focus slide bar 58 from the focus data unit 45, the focus drive control unit 10 executes focus adjustment of the focus adjustment lens mechanism 4 by drive-controlling the focus drive motor 4c based on the command.

The iris data unit 46 reads the position of the iris slide bar 62 on the slide bar (Step S25 of FIG. 10B), and issues a command for drive-controlling the iris drive motor 5c of the iris adjustment lens mechanism 5 to the iris drive control unit 11 by corresponding to the position of the iris slide bar 62 (Step S26 of FIG. 10B).

Upon receiving the command corresponding to the position of the iris slide bar 62 from the iris data unit 46, the iris drive control unit 11 executes iris adjustment of the iris adjustment lens mechanism 5 by drive-controlling the iris drive motor 5c based on the command.

In a case of having the optical filter adjustment lens mechanism 6 and the extender adjustment lens mechanism 7 illustrated in FIG. 1, for drive-controlling the optical filter drive motor 6a of the optical filter adjustment lens mechanism 6 and the extender drive motor 7a of the extender adjustment lens mechanism 7, the optical filter data unit and the extender data unit are provided to the data unit 22 illustrated in FIG. 1 so as to drive-control the optical filter adjustment lens mechanism 6 and the extender adjustment lens mechanism 7.

Specifically, the optical filter data unit of the data unit 22 reads the position of a filter slide bar on a slide bar, not illustrated, and issues a command for drive-controlling the optical filter drive motor 6a of the optical filter adjustment lens mechanism 6 to the optical filter drive control unit 12 by corresponding to the position of the filter slide bar.

Upon receiving the command corresponding to the read filter slide bar position from the optical filter data unit of the data unit 22, the optical filter drive control unit 12 executes adjustment of the optical filter adjustment lens mechanism 6 by drive-controlling the optical filter drive motor 6a based on the command.

The extender data unit of the data unit 22 reads the position of an extender slide bar on a slide bar, not illustrated, and issues a command for drive-controlling the extender drive motor 7a of the extender adjustment lens mechanism 7 to the extender drive control unit 13 by corresponding to the position of the extender slide bar.

Upon receiving the command corresponding to the read extender slide bar position from the extender data unit of the data unit 22, the extender drive control unit 13 executes magnification adjustment of the extender adjustment lens mechanism 7 by drive-controlling the extender drive motor 7a based on the command.

The zoom data unit 44 reads the current zoom value of the zoom adjustment lens mechanism 3 after the zoom adjustment of the zoom adjustment lens mechanism 3 is completed, and displays the zoom value as the address information 53, 54 on the operation screen 32 of the operation terminal 15 (Step S27 of FIG. 10B).

The focus data unit 45 reads the current focus value of the focus adjustment lens mechanism 4 after the focus adjustment of the focus adjustment lens mechanism 4 is completed, and displays the focus value as the address information 58, 59 on the operation screen 32 of the operation terminal 15 (Step S27 of FIG. 10B).

The iris data unit 46 reads the current iris value of the iris adjustment lens mechanism 5 after the iris adjustment of the iris adjustment lens mechanism 5 is completed, and displays the iris value as the address information 62, 63 on the operation screen 32 of the operation terminal 15 (Step S27 of FIG. 10B).

The optical filter data unit of the data unit 22 reads the current value of the optical filter adjustment lens mechanism 6 after the adjustment of the optical filter adjustment lens mechanism 6 is completed, and displays the value as the address information on the operation screen 32 of the operation terminal 15 (Step S27 of FIG. 10B).

The extender data unit of the data unit 22 reads the current value of the extender adjustment lens mechanism 7 after the adjustment of the extender adjustment lens mechanism 7 is completed, and displays the value as the address information on the operation screen 32 of the operation terminal 15 (Step S27 of FIG. 10B).

Next, operations of cases where the execution button (Goto button) 65 of the zoom data unit 44, the execution button (Goto button) 66 of the focus data unit 45, and the execution button (Goto button) 67 of the iris data unit 46 are operated will be described by referring to FIG. 10C.

Figure 10C:
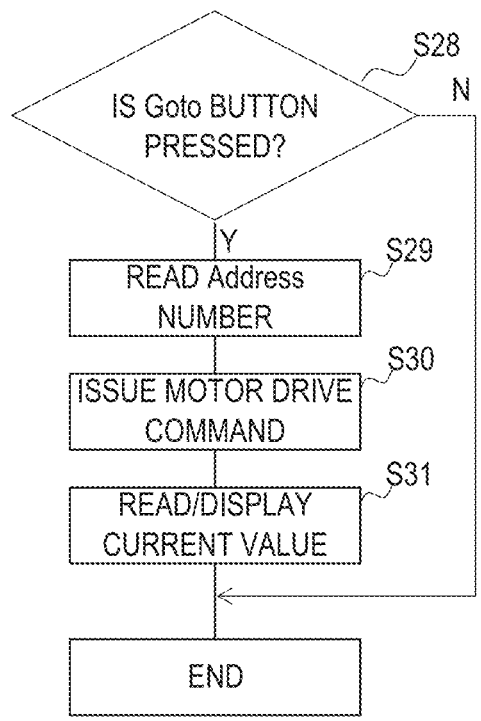

When the execution button 65 is operated, the zoom data unit 44 reads the address information 54 (Step S29 of FIG. 10C), and issues a command for drive-controlling the zoom drive motor 3c of the zoom adjustment lens mechanism 3 to the zoom drive control unit 9 by corresponding to the address information 54 (Step S30 of FIG. 10C).

Upon receiving the command corresponding to the address information 54 from the zoom data unit 44, the zoom drive control unit 9 executes zoom adjustment of the zoom adjustment lens mechanism 3 by drive-controlling the zoom drive motor 3c based on the command.

When the execution button 66 is operated, the focus data unit 45 reads the address information 59 (Step S29 of FIG. 10C), and issues a command for drive-controlling the focus drive motor 4c of the focus adjustment lens mechanism 4 to the focus drive control unit 10 by corresponding to the address information 59 (Step S30 of FIG. 10C).

Upon receiving the command corresponding to the address information 59 from the focus data unit 45, the focus drive control unit 10 executes focus adjustment of the focus adjustment lens mechanism 4 by drive-controlling the focus drive motor 4c based on the command.

When the execution button 67 is operated, the iris data unit 46 reads the address information 63 (Step S29 of FIG. 10C), and issues a command for drive-controlling the iris drive motor 5c of the iris adjustment lens mechanism 5 to the iris drive control unit 11 by corresponding to the address information 63 (Step S30 of FIG. 10C).

Upon receiving the command corresponding to the address information 63 from the iris data unit 46, the iris drive control unit 11 executes iris adjustment of the iris adjustment lens mechanism 5 by drive-controlling the iris drive motor 5c based on the command.

In a case of having the optical filter adjustment lens mechanism 6 and the extender adjustment lens mechanism 7 illustrated in FIG. 1, for drive-controlling the optical filter drive motor 6a of the optical filter adjustment lens mechanism 6 and the extender drive motor 7a of the extender adjustment lens mechanism 7, the optical filter data unit and the extender data unit are provided to the data unit 22 illustrated in FIG. 1 so as to drive-control the optical filter adjustment lens mechanism 6 and the extender adjustment lens mechanism 7.

Specifically, the optical filter data unit of the data unit 22 reads the address information, not illustrated, and issues a command for drive-controlling the optical filter drive motor 6a of the optical filter adjustment lens mechanism 6 to the optical filter drive control unit 12 by corresponding to the address information.

Upon receiving the command corresponding to the read address information from the optical filter data unit of the data unit 22, the optical filter drive control unit 12 executes adjustment of the optical filter adjustment lens mechanism 6 by drive-controlling the optical filter drive motor 6a based on the command.

The extender data unit of the data unit 22 reads the address information, not illustrated, and issues a command for drive-controlling the extender drive motor 7a of the extender adjustment lens mechanism 7 to the extender drive control unit 13 by corresponding to the address information.

Upon receiving the command corresponding to the read address information from the extender data unit of the data unit 22, the extender drive control unit 13 executes magnification adjustment of the extender adjustment lens mechanism 7 by drive-controlling the extender drive motor 7a based on the command.

The zoom data unit 44 reads the current zoom value of the zoom adjustment lens mechanism 3 after the zoom adjustment of the zoom adjustment lens mechanism 3 is completed, and displays the zoom value as the address information 53, 54 on the operation screen 32 of the operation terminal 15 (Step S31 of FIG. 10C).

The focus data unit 45 reads the current focus value of the focus adjustment lens mechanism 4 after the focus adjustment of the focus adjustment lens mechanism 4 is completed, and displays the focus value as the address information 58, 59 on the operation screen 32 of the operation terminal 15 (Step S31 of FIG. 10C).

The iris data unit 46 reads the current iris value of the iris adjustment lens mechanism 5 after the iris adjustment of the iris adjustment lens mechanism 5 is completed, and displays the iris value as the address information 62, 63 on the operation screen 32 of the operation terminal 15 (Step S31 of FIG. 10C).

The optical filter data unit of the data unit 22 reads the current value of the optical filter adjustment lens mechanism 6 after the adjustment of the optical filter adjustment lens mechanism 6 is completed, and displays the value as the address information on the operation screen 32 of the operation terminal 15 (Step S31 of FIG. 10C).

The extender data unit of the data unit 22 reads the current value of the extender adjustment lens mechanism 7 after the adjustment of the extender adjustment lens mechanism 7 is completed, and displays the value as the address information on the operation screen 32 of the operation terminal 15 (Step S31 of FIG. 10C).

Figure 10D:
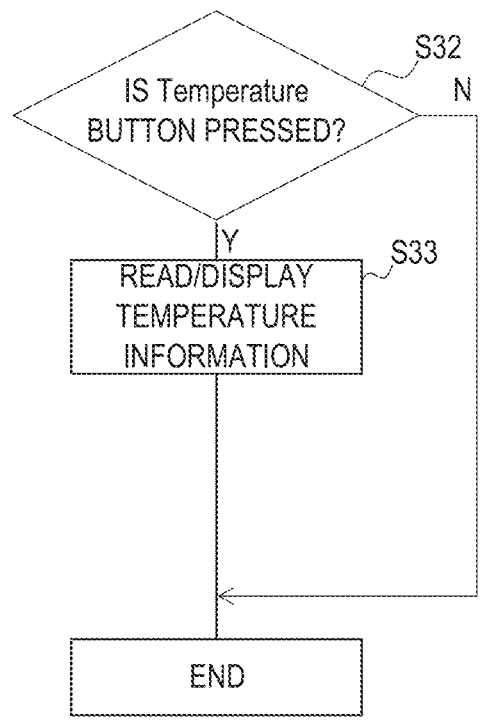

As illustrated in FIG. 10D, in a case where the ambient temperature information of the lens main body 1 is necessary, the start button 68 for acquiring the temperature information is activated (Step S32 of FIG. 10D) to drive-control the temperature detection unit 19 to acquire the temperature information measured by the temperature sensor 18, and the temperature information is displayed (Step S33 of FIG. 10D). The temperature information of FIG. 7 is displayed as 25° C., and the temperature information of FIG. 8 is displayed as 28° C. While the case of activating the start button 68 is described, the temperature may also be read and updated at regular intervals.

It is described above that the lens main body information output unit 14 sends the specification information to the operation terminal 15 via the network 16 and the lens information output unit 8 sends the characteristic information to the operation terminal 15 via the network 16 to drive-control each of the lens mechanisms 3, 4, 5, 6, and 7. However, the lens main body information output unit 14 may send the specification information and the characteristic information to the operation terminal 15 via the network 16.

As described above, according to the embodiment of the present invention, the lens device includes: the lens mechanism for forming an optical image, the lens mechanism being built into the lens main body; the drive control unit for drive-controlling the lens mechanism, the drive control unit being built unto the lens main body; the central processing unit that outputs the drive control signal to the drive control unit; and the network that forms the power supply interface for the lens main body and the communication interface for the central processing unit. Thus, the lens and the operation terminal are connected via the network, so that the connection mode between the lens and the operation terminal can be expanded to an n-to-one or n-to-n connection mode.

Since the connection mode regarding a plurality of lenses and the operation terminal can be expanded to an n-to-one mode, in a case of the camera for surveillance, industrial-use, and the like, it is possible to instantly deal with the case where a plurality of lenses are to be synchronized or where an arbitrary number of lenses are to be selected and drive-controlled from a plurality of lenses.

When the lens main body is connected to the camera main body by using the C mount or CS mount, the lens main body is optically and physically connected to the camera main body. Therefore, there is generally no electrical communication or power supply interface existing between the lens main body and the camera main body. According to the present invention, however, the power supply interface for the lens main body is formed via the network. Therefore, no external power supply is necessary, and specialized skills for setting the lens device become unnecessary by securing the power supply for the lens main body within the range of allowable voltage and allowable current of the power supply interface.

By start-controlling the lens main body independently from the camera main body based on the drive control signal from the central processing unit, it is possible to employ a configuration in which a plurality of lens main bodies are disposed on the network, and a plurality of lens mechanisms are synchronously drive-controlled or selectively drive-controlled based on the drive control signal from the central processing unit.

The invention claimed is:

1. A lens device for capturing an optical image, the lens device comprising:
   a lens main body, the lens main body including:
      a lens mechanism for forming the optical image;
      a drive motor configured to drive the lens mechanism;
      a drive controller configured to perform drive-controlling on the drive motor;
      a lens processor configured to provide a drive control signal to the drive controller;
      a lens information generator configured to provide characteristic information indicating a lens specification including a lens focal length and a maximum aperture; and
      a lens main body information generator configured to provide specification information indicating a lens body specification to be allocated to the lens main body;
   a network including a power supply interface for the lens main body and a communication interface for the lens processor; and
   an operation terminal, the operation terminal including:
      an allocator configured to:
         receive the characteristic information and the specification information via the network to recognize the lens main body without getting the characteristic information and the specification information from a camera main body, wherein the camera main body includes an imaging element, and the camera main body is configured to be optically and physically connectable to the lens main body and have no electrical communication and no power supply with the lens main body;
         allocate the drive controller corresponding to the lens mechanism of the recognized lens main body; and
      a data generator configured to generate the drive control signal; and
      a terminal processor configured to perform communication among the allocator, the data generator, and the lens processor to provide the drive control signal to the lens processor via the network,
   wherein the lens main body has a secured power supply within a range of an allowable voltage and an allowable current of the power supply interface, and the operation terminal is configured to cause the drive controller of the lens main body to perform the drive-controlling on the drive motor via the network.

2. The lens device according to claim 1, wherein
the lens main body is configured with a plurality of the lens main bodies that are disposed on the network; and
the lens mechanism is configured with a plurality of the lens mechanisms that are synchronously drive-controlled or selectively drive-controlled based on the drive control signal from the lens processor by an operation of the operation terminal.

3. The lens device according to claim 2,
wherein the plurality of lens main bodies are aggregated via the network to be connected to the operation terminal.

4. The lens device according to claim 2,
wherein the operation terminal is configured with a plurality of the operation terminals that are connected to the network having the plurality of the lens main bodies.

* * * * *